(12) United States Patent
Maeda et al.

(10) Patent No.: US 6,680,765 B1
(45) Date of Patent: Jan. 20, 2004

(54) LIQUID CRYSTAL DEVICE AND ELECTRONIC APPARATUS

(75) Inventors: Tsuyoshi Maeda, Yamanashi-ken (JP); Osamu Okumura, Chino (JP); Eiji Okamoto, Matsumoto (JP); Takumi Seki, Misato-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/424,627

(22) PCT Filed: Apr. 7, 1999

(86) PCT No.: PCT/JP99/01865

§ 371 (c)(1),
(2), (4) Date: Nov. 24, 1999

(87) PCT Pub. No.: WO99/53369

PCT Pub. Date: Oct. 21, 1999

(30) Foreign Application Priority Data

Apr. 8, 1998 (JP) ........................................... 10-096497
Jun. 9, 1998 (JP) ........................................... 10-160866

(51) Int. Cl.[7] ............................................ G02F 1/1335
(52) U.S. Cl. ........................ 349/117; 349/113; 349/114
(58) Field of Search ................................ 349/113, 114, 349/115, 117

(56) References Cited

U.S. PATENT DOCUMENTS 4,759,611 A  *  7/1988  Downey, Jr. ................ 349/122
5,289,301 A  *  2/1994  Brewer ........................ 345/87

FOREIGN PATENT DOCUMENTS

| JP | 50-90351 | 7/1975 | | |
| JP | 50-90531 | 7/1975 | | |
| JP | 6018861 a1 | * 1/1994 | ................ | 349/113 |
| JP | 06-313890 | 8/1994 | | |
| JP | 6-313890 | 11/1994 | | |
| JP | 07-318929 | 8/1995 | | |
| JP | 07-120730 | 12/1995 | | |
| JP | 7-318929 | 12/1995 | | |
| JP | 8-292413 | 11/1996 | | |
| JP | 9-171717 | 6/1997 | | |
| JP | 09-061854 | 7/1997 | | |
| JP | 10-325953 | 12/1998 | | |

* cited by examiner

*Primary Examiner*—James Dudek
(74) *Attorney, Agent, or Firm*—Harness, Dickey & Pierce, P.L.C.

(57) ABSTRACT

In a dark environment, when a backlight 119 is lighted, white light emitted from the surface of a light guide plate 118 passes through a polarizing plate 107 and a phase plate 108 and, further, passes through a transflective plate 111 and a transparent electrode 116 provided on the inner surface of a substrate 102 before it is introduced into a liquid crystal layer 3. Then, it is guided to the exterior of a liquid crystal cell and sequentially passes through a phase plate 106 and a polarizing plate 105 before it is guided to the exterior. In a bright environment, external light incident from the polarizing plate 105 passes through the liquid crystal layer 3, and is then reflected by the transflective plate 111 through the transparent electrode 116 before it is passed through the polarizing plate 105 again and guided to the exterior.

33 Claims, 17 Drawing Sheets

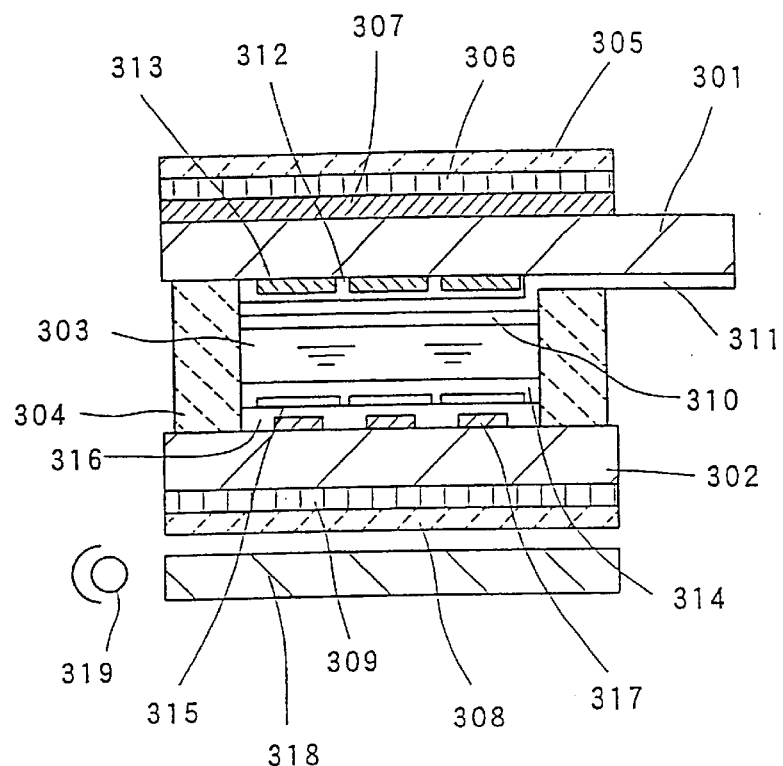
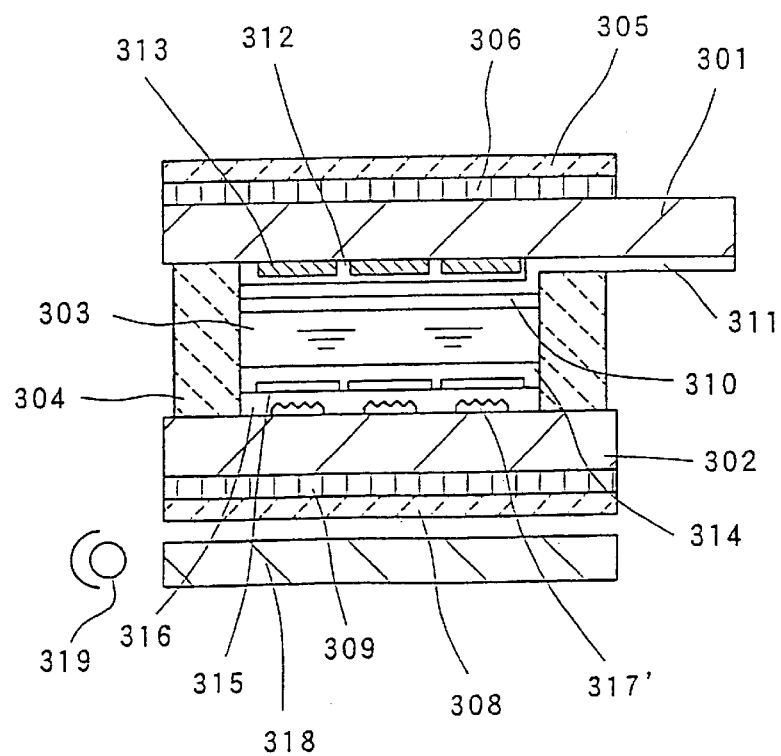
FIG. 12

FIG. 18
(a)
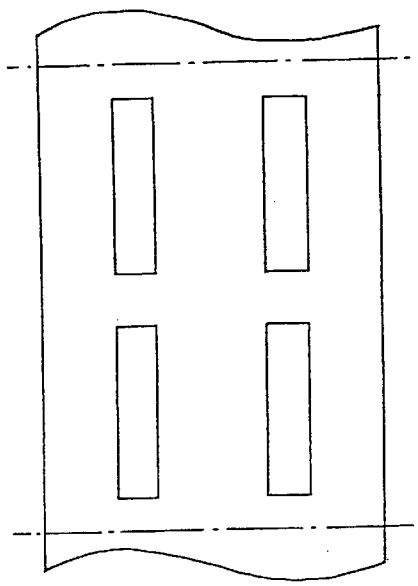
(b)
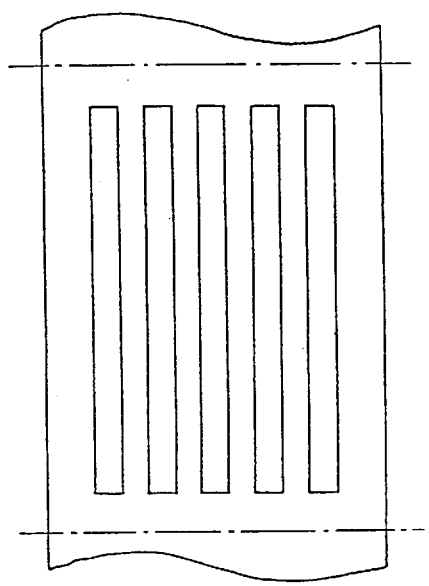
(c)
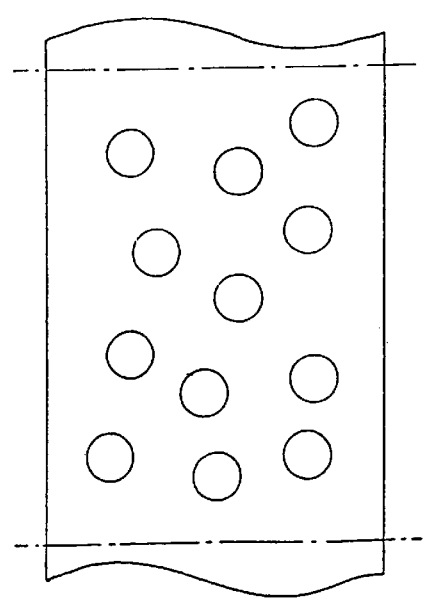
(d)
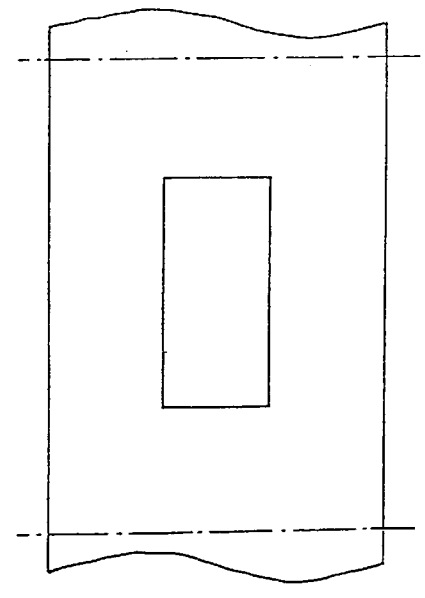

LIQUID CRYSTAL DEVICE AND ELECTRONIC APPARATUS

TECHNICAL FIELD

The present invention relates to a liquid crystal device and, in particular, to a structure of a liquid crystal device capable of switching between reflection type display and transmission type display and to an electronic apparatus using this liquid crystal device.

BACKGROUND ART

Conventionally, a reflection type liquid crystal device, which consumes little power, has been widely used as a display section attached to a portable device or apparatus. It has a problem in that it makes the display visible by utilizing external light, so that it is impossible to read the display in a dark place. In view of this, a liquid crystal device has been proposed which, in a light place, utilizes external light as a usual reflective type liquid crystal device but which, in a dark place, enables the display to be seen by means of an inner light source. As disclosed in Japanese Utility Model Laid-Open No. 57-049271, in this proposed device, a polarizing plate, a transflective plate, and a backlight are arranged in this order on the outer surface of the liquid crystal panel, which is the side opposite to the observation side. In this liquid crystal device, when it is light surroundings, external light is taken in and the light reflected by the transflective plate is utilized to effect reflection type display. When it becomes dark, the backlight illuminates and the display is made visible by the light transmitted through the transflective plate, thus effecting transmission type display.

Japanese Patent Laid-Open No. 8-292413 discloses another liquid crystal device in which the brightness of the reflection type display is improved. In this liquid crystal device, a transflective plate, a polarizing plate, and a backlight are arranged in this order on the outer surface of the liquid crystal panel on the side opposite to the observation side. Under the light surroundings, external light is taken in and the light reflected by the transflective plate is utilized to effect reflection type display, and under the dark surroundings, the back light illuminates and the display is made visible by the light transmitted through the polarizing plate and the transflective plate, thus effecting transmission type display. In this construction, there is no polarizing plate between the liquid crystal cell and the transflective plate, so that it is possible to achieve a reflection type display brighter than that of the above-described liquid crystal device.

DISCLOSURE OF INVENTION

However, in the liquid crystal device disclosed in Japanese Patent Laid-Open No. 8-292413, a transparent substrate exists between the liquid crystal layer and the transflective plate, resulting in a double image, a smeared image, etc.

Further, nowadays, as portable apparatus, OA apparatus, etc. are developed, a colored display is required of liquid crystal devices, and in many apparatuses using reflection type liquid crystal devices, a colored display is required. However, in the system as disclosed in the above-mentioned publication, in which a liquid crystal device is combined with a color filter, the transflective plate is arranged behind the liquid crystal panel, so that a thick transparent liquid crystal panel exists between the liquid crystal layer or the color filter and the transflective plate, with the result that a double image, a smeared image, etc. are generated by parallax, making it impossible to achieve a satisfactory color development.

To solve the above problem, Japanese Patent Laid-Open No. 7-318929 proposes a transflective type color liquid crystal device in which a reflecting plate is arranged so as to be in contact with the liquid crystal layer. However, in this liquid crystal device, it is impossible to recognize the display in the dark surroundings.

On the other hand, a transflective type liquid crystal device has been proposed in Japanese Patent Laid-Open No. 7-318929 in which a pixel electrode also serving as the transflective layer is formed on the inner surface of the liquid crystal cell. Further, disclosed is a construction in which a pixel electrode consisting of an ITO (indium tin oxide) layer is superimposed on a transflective layer consisting of a metal layer through the intermediation of an insulating layer. Further, in this liquid crystal device, on the back side of the liquid crystal cell, there is no optical element which varies the polarization of the incident light from the backlight between the transflective plate and the polarizing plate, so that the incident light from the backlight always impinges upon the liquid crystal cell as linearly polarized light passing through the polarizing plate. As a result, when the optical characteristics of the polarizing plate and the phase plate on the front side of the liquid crystal cell, and the liquid crystal cell, etc. are set so as to enhance the contrast characteristic at the time of reflection type display, it is impossible to achieve a satisfactory contrast characteristic at the time of transmission type display. Conversely, when the optical characateristics of these components are set so as to enhance the contrast characteristic at the time of transmission type display, it is impossible to achieve a satisfactory contrast characteristic at the time of reflection type display. Similarly, when the optical characteristic of these components are set so that the color compensation for the color due to wavelength dispersion of light may be effected in a satisfactory manner at the time of reflection type display, such color compensation cannot be effected in a satisfactory manner at the time of transmission type display. Conversely, when the optical characteristics of these components are set so that such color compensation may be effected in a satisfactory manner at the time of reflection type display, such color compensation cannot be effected in a satisfactory manner at the time of transmission type display. That is, generally speaking, it is very difficult to achieve high contrast or effect color compensation in a satisfactory manner at the time of both reflection type display and transmission type display, making it impossible to effect high quality image display.

The present invention has been made in view of the above problem. It is accordingly an object of the present invention to provide a transflective type liquid crystal device of type which is capable of switching between reflection type display and transmission type display, wherein a double image or smeared image due to parallax is not generated, making it possible to effect high quality image display at the time of both reflection type display and transmission type display and an electronic apparatus using such a liquid crystal device.

To achieve the above object, there is provided, in accordance with the present invention, a liquid crystal device comprising a pair of first and second transparent substrates, a liquid crystal layer held between the first and second substrates, a laminate which is formed on the liquid crystal layer side surface of the second substrate and in which at least a transflective layer and a transparent electrode layer are stacked together, an illuminating device arranged on the side of the second substrate which is opposite to the liquid crystal layer, a first polarizing plate arranged on the side of the first susbstrate which is opposite to the liquid crystal layer, a first phase plate arranged between the first substrate and the first polarizing plate, a second polarizing plate arranged between the second substrate and the illuminating device, and a second phase plate arranged between the second substrate and the second polarizing plate.

In the liquid crystal device of the present invention, at the time of reflection type display, the laminate reflects external light coming from the first substrate side to the liquid crystal layer side by the transflective layer included therein. Since the laminate is arranged on the liquid crystal layer side of the second substrate, there is scarcely any gap between the laminate and the liquid crystal layer, so that a double image display or a smeared image due to parallax is not generated. On the other hand, at the time of transmission display, the laminate allows the light source light emitted from the illuminating device and coming from the second substrate side to be transmitted to the liquid crystal layer side through the transflective layer and the transparent electrode layer included therein. Thus, in a dark place, a bright display is possible by using the light source light. This transflective layer may consist of a reflection layer provided with minute openings or designed such that light can be transmitted through a region thereof, or a layer exhibiting semi-transmission-reflection property over the entire area (for example, a thin metal layer thin enough to allow light to be transmitted therethrough or a half mirror on the market).

In the liquid crystal device of the present invention, in particular, external light reflected by the non-opening area (reflection area or non-transmission area), where no opening, gap, etc. is formed, of the transflective layer is transmitted through the transparent electrode layer stacked on the transflective layer and transmitted through the liquid crystal portion driven by the transparent electrode layer portion opposed to the non-opening area. That is, reflection type display can be effected by using the liquid crystal portion through longitudinal electric field by the transparent electrode layer portion opposed to the non-opening area. On the other hand, the light transmitted through the opening area (non-reflection area or transmission area) of the transflective layer, where an opening, gap, etc. is formed, is transmitted through the transparent electrode layer stacked on the transflective layer and transmitted through the liquid crystal portion driven by the transparent electrode layer portion opposed to the opening area. That is, transmission type display can be effected by using the liquid crystal portion driven through longitudinal electric field by the transparent electrode layer portion opposed to the opening area. In this way, no matter what the pattern of the transflective layer may be, the electric field applied to the liquid crystal layer by the transparent electrode layer is not affected, so that, independently of the opening pattern or the gap pattern of the transflective layer, the alignment of the liquid crystal is uniform in each dot or each pixel at the time of reflection type display and at the time of transmission type display, whereby it is possible to prevent a deterioration in display quality due to disturbance of the alignment.

Further, in the liquid crystal device of the present invention, there are provided a first polarizing plate and a first phase plate and a second polarizing plate and a second phase plate, so that display control can be effected in a satisfactory manner in both reflection type display and transmission type display. More specifically, the influence of color, etc. due to light wavelength dispersion at the time of reflection type display on the color tone can be reduced by the first phase plate, and the influence of color, etc. due to light wavelength dispersion at the time of transmission type display on the color tone can be reduced by the second phase plate. Regarding the first and second phase plates, it is also possible to respectively arrange a plurality of phase plates, depending on color compensation or visual angle compensation. When a plurality of phase plates are used as the first or second phase plates, optimization of color compensation or visual angle compensation can be more easily effected. Further, the optical characteristics of the first polarizing plate, the first phase plate, the liquid crystal layer, and the transflective layer are set such that the contrast in reflection type display is enhanced, and, under this condition, the optical characteristics of the second polarizing plate and the second phase plate are set such that the contrast in transmission type display is enhanced, whereby it is possible to obtain high contrast characteristic in both reflection type display and transmission type display.

As the material of this transflective layer, a metal whose main constituent is Al (aluminum) is used. However, the material is not particularly limited as long as it is a metal capable of reflecting external light of visible range, such as Cr (chromium) or Ag (silver).

As the drive system for the liquid crystal device of the present invention, it is possible to adopt various well-known drive systems, such as passive matrix drive system, TFT (thin film transistor) active matrix drive system, TFD (thin film diode) active matrix drive system, and segment drive system. In many cases, the voltage-reflectance (transmittance) characteristic of the liquid crystal cell differs between reflection type display and transmission type display, so that it is desirable to make the drive voltage different between reflection type display and transmission type display, optimizing it for each. Further, on the first substrate, a plurality of stripe-like or segment-like transparent electrodes are formed according to the drive system, or a transparent electrode is formed over the entire first substrate. Alternatively, it is also possible to drive through a lateral electric field parallel to the substrate between the transparent electrodes on the second substrate, without providing an opposite electrode on the first substrate.

In a form of the liquid crystal device of the present invention, the transflective layer, a color filter, a protective layer and the transparent electrode layer are stacked in the laminate in that order from the side nearest to the second substrate.

In this form, a color filter is further provided on the transflective layer, so that it is possible to effect reflection type color display by external light and transmission type color display utilizing an illuminating device. It is desirable that the color filter exhibit a transmittance of not less than 25% to all the light in wavelength range of not less than 380 nm and not more than 780 nm. This makes it possible to realize bright reflection type color display and transmission type color display.

Usually, a metal whose main constituent is Al is used for the transflective layer. However, an Al metal is little resistant to solvent and difficult to handle. Further, it is subject to flaws. However, in this form, the reflecting surface of the transflective layer formed of an Al metal or the like is covered with a color filter and a protective layer to form a transparent electrode layer, so that Al is not brought into direct contact with the developer for forming a transparent electrode such as ITO layer. Thus, the Al metal is easier to handle, and less subject to flaws, etc. For this protective layer, it is possible to use a material such as an acrylic transparent resin or silicon oxide.

The protective layer between the color filter and the transparent electrode layer may be omitted. This applies to the case in which the present invention is used as an opposite substrate to a substrate with an active element of a TFT active matrix type liquid crystal device and in which patterning is not needed for the transparent electrode layer of the opposite substrate.

In another form of the liquid crystal device of the present invention, in the laminate, there are stacked the transflective layer, an insulating layer and the transparent electrode layer, in that order from the side nearest to the second substrate.

In this form, it is possible to insulate the transparent electrode layer and the transflective layer by the insulaing layer, so that even if the transflective layer is formed in an arbitrary pattern of a conductive metal such as Al, no problem is generated in the insulating condition of the transparent electrode layer due to the presence of the transflective layer. Further, the reflecting surface of the transflective layer formed of an Al metal or the like is covered with an insulating layer to form a transparent electrode layer, so that the Al is not brought into direct contact with the developer for forming the transparent electrode such as an ITO layer. Thus, the Al metal is easier to handle and less subject to flaws or the like.

In the form in which the insulating layer is also stacked in this laminate, a color filter and a protective layer may be formed on the liquid crystal layer side surface of the first substrate, in that order as from the side nearest to the first substrate.

In this construction, by utilizing the color filter which is formed not on the second substrate side but on the first substrate side and which is protected by the protective layer, it is possible to effect reflection type color display by external light and transmission type color display utilizing an illuminating device.

In the form in which the insulating layer is also stacked in the laminate, the insulating layer may be formed by oxidizing the surface portion of the transflective layer.

In this form, it is possible to obtain a very thin insulating layer having high insulation property. In this case, it is desirable to use aluminum as the transflective layer. This is because aluminum can maintain its reflectance if oxidized. When thus oxidizing the insulating layer, the transflective layer may undergo anodic oxidation or thermal oxidation.

In the form in which the insulating layer is also stacked in the laminate, the insulating layer may be formed by stacking together two or more different insulating layers.

In this construction, it is possible to enhance the insulating property of the insulating layer. As one of the insulating layers, it is possible to use an oxide of aluminum or the like, and, as the other insulating layer, it is possible to use an $SiO_2$ (silicon oxide) layer, an overcoating layer using an organic substance. When forming an $SiO_2$ layer, evaporation, sputtering, CVD method or the like is used. When forming an organic film, spin coating or the like is used.

In the form in which an insulating layer is also stacked in the laminate, it is also possible for a color filter to be further stacked in the laminate between the insulating layer and the transparent electrode layer.

In this construction, it is possible to form on the first substrate a laminate in which a transflective layer, an insulating layer, a color filter and a transparent electrode layer are stacked together, and it is possible to protect the transflective layer with the insulating layer and to effect a reflection type color display using external light and a transmission type color display utilizing an illuminating device. In particular, since the reflecting surface of the transflective layer of Al metal or the like is covered with an insulating layer, and a color filter and a transparent electrode layer are formed, the Al is not brought into direct contact with the developer for forming the color filter or the developer for forming the transparent electrode.

In this case, further, a protective layer may be formed in the laminate between the color filter and the transparent electrode layer.

In this construction, it is possible to form on the first substrate a laminate in which a transflective layer, an insulating layer, a color filter, a protective layer and a transparent electrode layer are stacked together, and it is possible to protect the transflective layer with the insulating layer and to protect the color filter with the protective layer and, further, to perform a reflection type color display using external light and a transmission type color display utilizing an illuminating device.

In the form in which an insulating layer is also stacked in the laminate, it is possible to further provide an active element formed on the insulating layer and connected to the transparent electrode layer.

In this construction, it is possible to form an active drive type liquid crystal device capable of high quality reflection type and transmission type display by using an active element insulated from the transflective layer by the insulating layer. Here, as the active element, it is possible to use a three terminal element such as TFT element or a two terminal element such as TFD element.

In another form of the liquid crystal device of the present invention, a plurality of openings are formed in the transflective layer.

In this form, when there is enough external light, it is possible to perform reflection type display by taking in external light and reflecting it by the non-opening portion of the transflective layer. When there is not enough external light, the illuminating device is lighted, and the light source light is introduced into the liquid crystal layer through the opening of the transflective layer, thereby making it possible to perform transmission type display. It is desirable for the diameter of the opening to be not less than 0.01 $\mu$m and not more than 20 $\mu$m. Due to this arrangement, it is difficult for the human eye to recognize, and it is possible to restrain the deterioration in the display generated due to the provision of the opening, making it possible to realize both reflection type display and transmission type display. Further, it is desirable that the opening be formed in an area proportion of not less than 5% and not more than 30% with respect to the transflective layer. This makes it possible to restrain the decrease in the brightness of the reflection type display and, further, to realize transmission type display by the light source light introduced into the liquid crystal layer through the opening of the transflective layer.

In another form of the liquid crystal device of the present invention, a plurality of the transflective layers are formed at predetermined intervals.

In this form, transmission type display can be realized by the light source light emitted from the illuminating device and introduced into the liquid crystal layer through the gaps of the plurality of transflective layers formed linearly. In this case also, it is desirable for the gap of the transflective layers to be not less than 0.01 $\mu$m and not more than 20 $\mu$m, and the gap of the transflective layers is preferably formed in an area proportion of not less than 5% and not more than 30% with respect to the transflective layers.

In another form of the liquid crystal device of the present invention, the device is in a dark (black) state when it is not being driven.

In this form, since the device is in a dark state when it is not being driven, it is possible, in transmission type display, to restrain light leakage between pixels or dots where the liquid crystal is not driven, whereby it is possible to obtain a transmission type display of higher contrast. Further, in reflection type display, it is possible to restrain reflected light unnecessary for display from between pixels and dots, so that it is possible to obtain a display of higher contrast. In this way, it is possible in general to achieve an improvement in contrast in transmission type display and reflection type display without providing a light shielding layer called black matrix or black mask at a position opposed to the gap of the reflection electrode. In addition, by providing such a light shielding layer, it is also possible to prevent the brightness in reflection type display from being reduced.

In another form of the liquid crystal device of the present invention, the above-mentioned transflective layer contains 95% by weight or more of Al, and its thickness is not less than 10 nm and not more than 40 nm.

In this form, it is possible to obtain a satisfactory transmittance and reflectance by a relatively thin transflective layer. According to an experiment, it is possible to prepare a transflective layer in which the transmittance is not less than 1% and not more than 40% and the reflectance is not less than 50% and not more than 95% within this thickness range.

In another form of the liquid crystal device of the present invention, a scattering plate is further provided on the opposite side to the liquid crystal layer of the first substrate.

In this form, it is possible to show the mirror surface feel of the transflective layer on the scattering surface (white surface) by means of the scattering plate. Further, due to the scattering by the scattering plate, it is possible to realize a display of a wide angle of view. The scattering plate may be at any position as long as it is on the opposite side to the liquid crystal layer of the first substrate. Taking into account the influence of backscattering of the scattering plate (scattering to the incident light side when external light is incident), it is desirable to arrange it between the first polarizing plate and the first substrate. The backscattering is scattering light that has nothing to do with the display of the liquid crystal device; when there is this backscattering, the contrast in reflection type display is deteriorated. By arranging it between the first polarizing plate and the first substrate, it is possible to reduce approximately by half the light quantity of the backscattering by means of the first polarizing plate.

In another form of the liquid crystal device of the present invention, the transflective layer has recesses and protrusions.

In this form, it is possible to eliminate the mirror surface feel of the transflective layer by the protrusions and recesses and show it as a scattering surface (white surface). Further, due to the scattering by the recesses and protrusions, it is possible to realize a display of a wide angle of view. These recesses and protrusions can be formed by using a photo-sensitive acrylic resin or the like as the base of the transflective layer, or by roughening the base glass substrate itself by hydrofluoric acid. Further, it is desirable to further form a transparent flattening layer on the recess/protrusion surface of the transflective layer to flatten the surface facing the liquid crystal layer (the surface forming the alignment layer) from the viewpoint of preventing alignment defect of the liquid crystal.

The above object of the present invention can be achieved by an electronic apparatus equipped with the liquid crystal device of the present invention described above.

In accordance with the present invention, it is possible to realize various electronic apparatuses using a transflective type liquid crystal device or a transflective type color liquid crystal device free from a double image or smeared image due to parallax and capable of effecting display switching between reflection type display and transmission type display. Such an electronic apparatus can realize a high image quality display independently of the ambient external light in a light place or a dark place.

BRIEF DESCRIPTION OF THE DRAWINGS

FIG. 6b is a characteristic diagram showing the drive voltage–reflectance R/transmittance T of the liquid crystal device when there is the relationship of FIG. 6a;

FIG. 11 is a schematic longitudinal sectional view showing the construction of a liquid crystal device according to a fourth embodiment of the present invention;

FIG. 12 is a schematic longitudinal sectional view showing the construction of a liquid crystal device according to a fifth embodiment of the present invention;

FIG. 13b is a partial perspective view of the sixth embodiment shown in FIG. 13a;

FIG. 16b is a partial perspective view of the ninth embodiment shown in FIG. 16a;

FIG. 17b is a partial perspective view of the tenth embodiment shown in FIG. 17a;

FIG. 18 is an enlarged plan view showing concrete examples of openings provided in the transflective layer of each embodiment;

BEST MODE FOR CARRYING OUT THE INVENTION

The best mode for carrying out the present invention will now be described with respect to each embodiment with reference to the drawings.

FIRST EMBODIMENT

Figure 1:
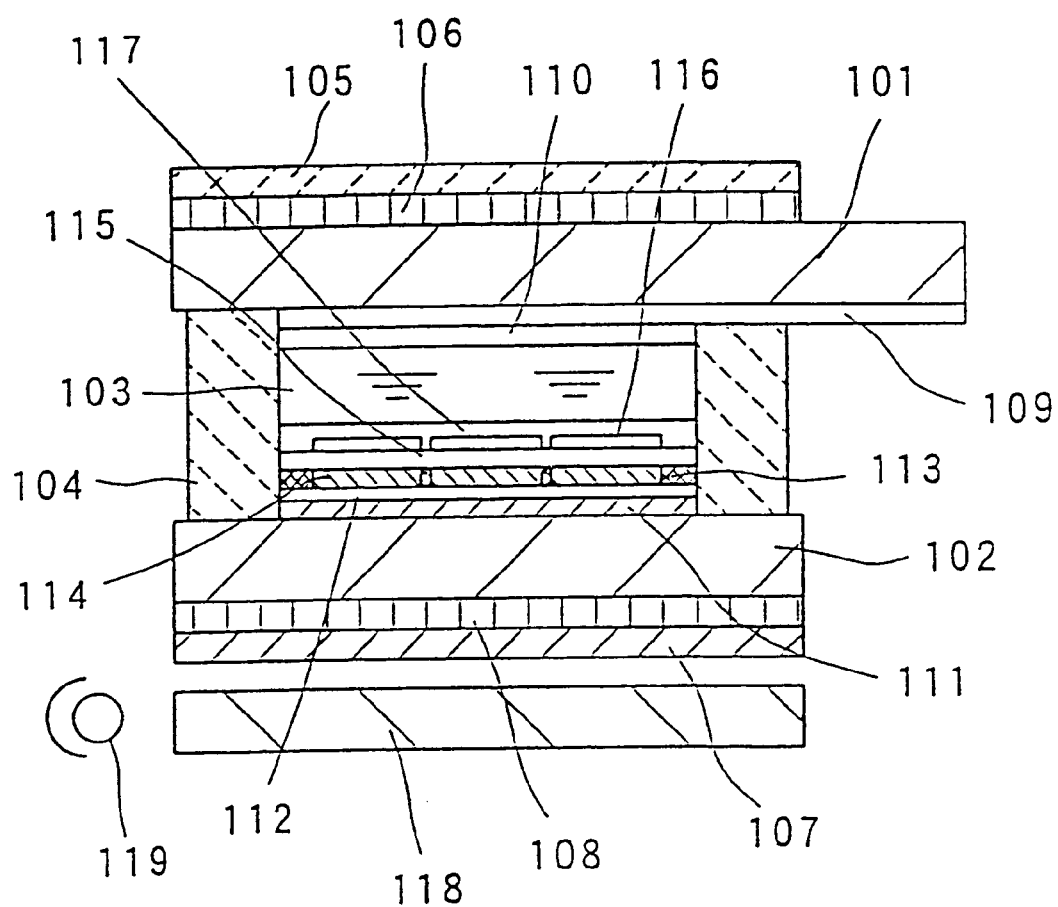
FIG. 1 is a schematic longitudinal sectional view showing the construction a liquid crystal device according to a first embodiment of the present invention.

A liquid crystal device according to the first embodiment of the present invention will be described with reference to FIGS. 1 through 4. FIG. 1 is a schematic longitudinal sectional view showing the construction of the first embodiment of the present invention. While the first embodiment basically relates to a passive matrix type liquid crystal display device, a similar construction is also applicable to other types of liquid crystal devices such as an active matrix type device and a segment type device.

As shown in FIG. 1, in the first embodiment, there is formed between two transparent substrates 101 and 102 a liquid crystal cell in which a liquid crystal layer 103 is sealed in by a frame-like sealing material 104. The liquid crystal layer 103 consists of a nematic liquid crystal having a predetermined twist angle. On the inner surface of the upper transparent substrate 101, there are formed a plurality of stripe-like transparent electrodes 109 formed of ITO (indium tin oxide) layers or the like, and, on the surface of the transparent electrodes 109, there is formed an alignment layer 110, which has undergone rubbing processing in a predetermined direction.

On the inner surface of the lower transparent substrate 102, there are sequentially formed a transflective plate 111, a protective layer 112 formed of $SiO_2$, and a color filter 114. In the color filter 114, there are arranged in a predetermined pattern three color layers of R (red), G (green) and B (blue). The surface of the color filter 114 is covered with a transparent protective layer 115, and, on the surface of this protective layer 115, there are formed a plurality of stripe-like transparent electrodes 116 formed by ITO layers or the like. The plurality of stripe-like transparent electrodes 116 respectively formed for each color layer of the color filter 114 are arranged so as to cross the transparent electrodes 109.

In the case of an active matrix type device equipped with an MIM element, TFT element or the like, each transparent electrode 116 has a rectangular configuration, and is connected to wiring through an active element (See the seventh and eighth embodiments described below).

The transflective plate 111 is formed of Cr, Al or the like, and its surface constitutes a reflecting surface reflecting the light incident from the transparent substrate 101 side. On the surface of the transparent electrodes 116, there is formed an alignment layer 117, which has undergone rubbing processing in a predetermined direction. The transflective plate 111 has openings having a diameter of 2 $\mu$m; the total area of the openings is approximately 10% with respect to the total area of the transflective plate, the openings being provided at random.

Figure 2A:
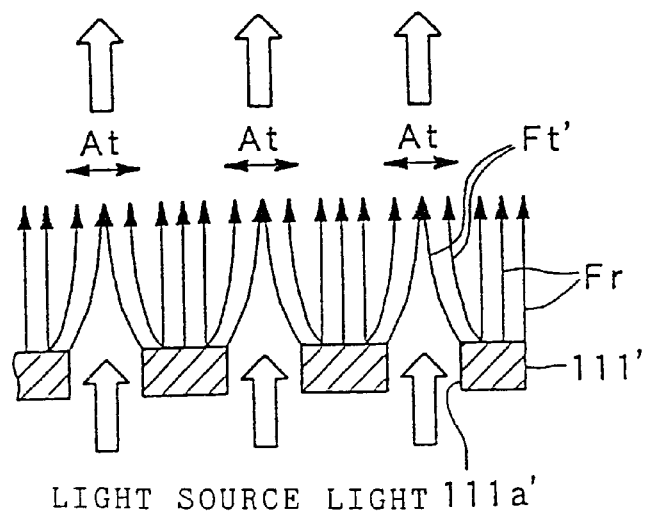
FIG. 2a is a conceptual diagram showing how an electric field is applied to a liquid crystal layer by a transflective electrode of a single layer structure in a comparative example.
Figure 2B:
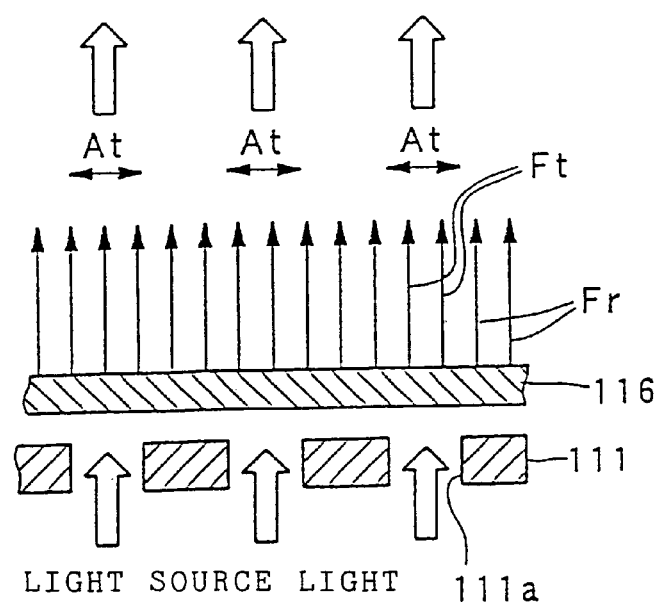
FIG. 2b is a conceptual diagram showing how an electric field is applied to a liquid crystal layer by a transparent electrode stacked on a transflective plate in the first embodiment.

The electric field applied to the liquid crystal layer 103 by the transparent electrodes 116 stacked on the transflective plate 111 in the first embodiment will be described with reference to FIGS. 2a and 2b. FIG. 2a is a schematic conceptual diagram showing how, in a comparative example which uses a transflective plate provided with minute openings 111a' (having a diameter of, for example, 2 $\mu$m) and transflective electrodes 111' of unitary layer structure also serving as pixel electrodes, an electric field is applied to the liquid crystal layer by the transflective electrodes 111'. FIG. 2b is a schematic conceptual diagram showing how, in the first embodiment, an electric field is applied to the liquid crystal layer by the transparent electrodes 116 stacked on the transflective plate 111.

As shown in FIG. 2a, when, in the comparative example, the transflective electrodes 111' consisting of unitary conductive layers are utilized, it is possible to drive, at the time of reflection type display, the liquid crystal portion where the external light reflected by the non-opening region excluding the opening region At passes with a longitudinal electric field Fr (an electric field in a direction perpendicular to the substrate) by the transflective electrode 111' portion in the non-opening region. However, at the time of transmission type display, it is necessary to drive the liquid crystal portion in the opening region At where the light source light incident from the openings 111a' of the transflective electrodes 111' passes with an oblique electric field Ft' by the transflective electrode 111' portion in the non-opening region. That is, at the time of transmission type display, display is effected by driving the liquid crystal with a distorted electric field in the opening region At, so that, compared to the case in which the liquid crystal is driven by the longitudinal electric field, the display quality deteriorates due to the disturbance of the liquid crystal alignment.

As shown in FIG. 2b, in contrast to this, when, in the first embodiment, the transparent electrode 116, which is stacked on the transflective plate 111 provided with minute openings 111a and which is provided with no openings, is utilized, it is possible, at the time of reflection type display, to drive with the longitudinal electric field Fr by the transparent electrode 111 portion in the non-opening region as in the case of the comparative example. Further, at the time of transmission type display also, it is possible to drive the liquid crystal portion in the opening region At where the light source light incident from the openings 111a of the transflective electrode 111 passes with the longitudinal electric field Ft by the transparent electrode 111 portion opposed to the openings 111a. In this way, the electric field applied to the liquid crystal layer by the transparent electrode 116 is not affected no matter what the pattern of the transflective plate 111, so that, independently of the opening pattern or the gap pattern of the transflective plate 111, the liquid crystal alignment direction is uniform in each dot or each pixel due to the longitudinal electric field applied from the transparent electrode 116, whereby it is possible to prevent a deterioration in display quality attributable to disturbance of the alignment direction.

The various constructions of these minute openings 111a will be specifically described below (See FIG. 18).

Referring to FIG. 1 again, a polarizing plate 105 is arranged on the outer surface of the upper transparent substrate 101, and a phase plate 106 is arranged between the polarizing plate 105 and the transparent substrate 101. Further, below the liquid crystal cell, a phase plate 108 is arranged behind the transparent substrate 102, and a polarizing plate 107 is arranged behind the phase plate 108. Below the polarizing plate 107, there is arranged a backlight having a fluorescent tube 119 emitting white light and a light guide plate 118 equipped with an incident end surface extending along the fluorescent tube 119. On the entire back surface of the light guide plate 118, there is formed a roughened surface for scattering or it is a transparent member consisting of an acrylic resin plate on which a print layer for scattering is formed; the light from the fluorescent tube 119, which is the light source, is received by its end surface, and a substantially uniform light is emitted from the upper side in the drawing. As the backlight, it is also possible to use LED (light emitting diode), EL (electroluminescence), etc.

In the first embodiment, to prevent leakage of light from the region between the dots at the time of transmission type display, the black matrix layer 113, which is the lightproof portion formed between the color layers of the color filter 114, is provided substantially in planar correspondence with the dot intervals. The black matrix layer 113 is formed by the covering with a Cr layer or by using a photosensitive black resin.

In this way, in the first embodiment, the polarizing plate 105 and the phase plate 106 are arranged above the liquid crystal cell, and the polarizing plate 107 and the phase plate 108 are arranged below the liquid crystal cell, so that it is possible to perform a satisfactory display control in both reflection type display and transmission type display. More specifically, it is possible to mitigate the influence on tint such as coloring due to the light wavelength dispersion at the time of reflection type display by the phase plate 106 (that is, to optimize the display at the time of reflection type display by using the phase plate 106), and, at the same time, to mitigate the influence on tint such as coloring due to the light wavelength dispersion at the time of transmission type display by the phase plate 108 (that is, to optimize the display at the time of transmission type display by the phase plate 108, with the display at the reflection type display being optimized by the phase plate 106). Regarding the phase plates 106 and 108, it is also possible to arrange a plurality of phase plates according to coloring compensation or vision compensation of the liquid crystal cell. By thus using a plurality of phase plates 106 and 108, it is possible to more easily optimize the coloring compensation or vision compensation.

Furthermore, the optical characteristics of the polarizing plate 105, the phase plate 106, the liquid crystal layer 103 and the transflective plate 111 are set such that the contrast in reflection type display is enhanced, and, under this condition, the optical characteristics of the polarizing plate 107 and the phase plate 108 are set such that the contrast in transmission type display is enhanced, whereby it is possible to achieve a high contrast characteristic in both reflection type display and transmission type display. The optical characteristics of the polarizing plate 105, the phase plate 106, the liquid crystal layer 103 and the transflective plate 111 are set such that, for example, in reflection type display, external light passes through the polarizing plate 105 to become linearly polarized light and, further, passes through the phase plate 106 and the liquid crystal layer 103 portion to which no voltage is being applied (in a dark display state) to become right circularly polarized light before it reaches the transflective plate 111, where it is reflected to reverse its direction and converted to left circularly polarized light; it then again passes the liquid crystal layer 103 portion to which no voltage is being applied to be converted to linearly polarized light before it is absorbed by the polarizing plate 105 (that is, it becomes dark). At this time, the external light passing through the liquid crystal layer 103 portion to which voltage is being applied (in a bright display state) is allowed to pass through the liquid crystal layer 103 portion, so that it is reflected by the transflective plate 111 and emitted from the polarizing plate 105 (that is, it becomes bright). On the other hand, in transmission type display, the optical characteristics of the polarizing plate 107 and the phase plate 108 are set such that the light source light emitted from the backlight and transmitted through the transflective plate 111 by way of the polarizing plate 107 and the phase plate 108 becomes a light similar to the left circularly polarized light reflected by the transflective plate 111 in the case of the reflection type display described above. Then, although the light source and the optical path are different as compared to the case of reflection type display, the light source light transmitted through the transflective plate 111 passes through the liquid crystal layer 103 portion to which no voltage is being applied (in a dark display state) to be converted to linearly polarized light before it is absorbed by the polarizing plate 105 (that is, it becomes dark) like the external light reflected by the transflective plate 111 in reflection type display. At this time, the light passing through the liquid crystal layer 103 portion to which voltage is being applied (in a bright display state) is allowed to pass through the liquid crystal layer 103 portion and emitted from the polarizing plate 105 (that is, it becomes bright).

Figure 3:
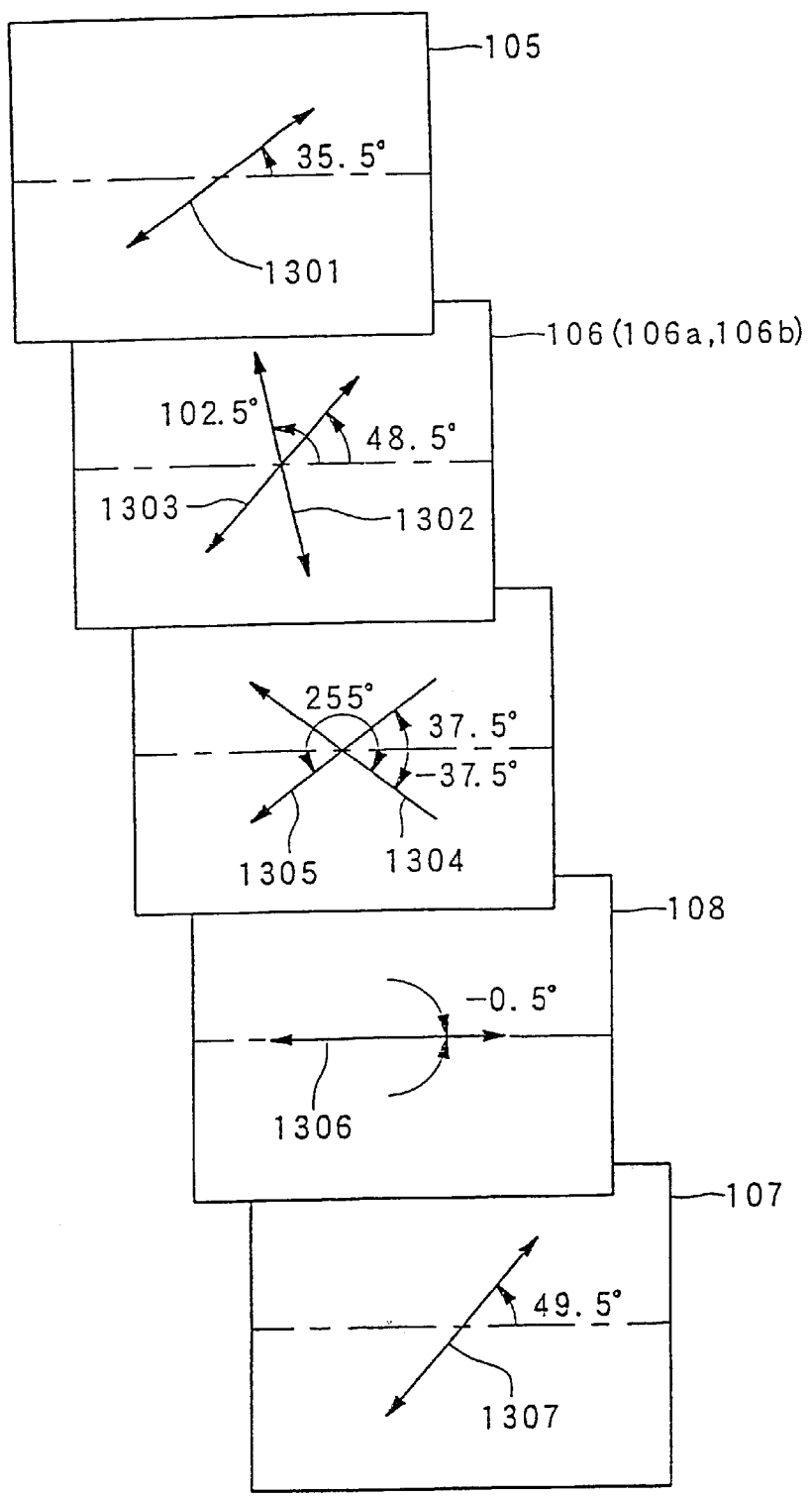
FIG. 3 is a conceptual diagram showing an example of a suitable optical characteristic setting pattern in the first embodiment.
Figure 4:
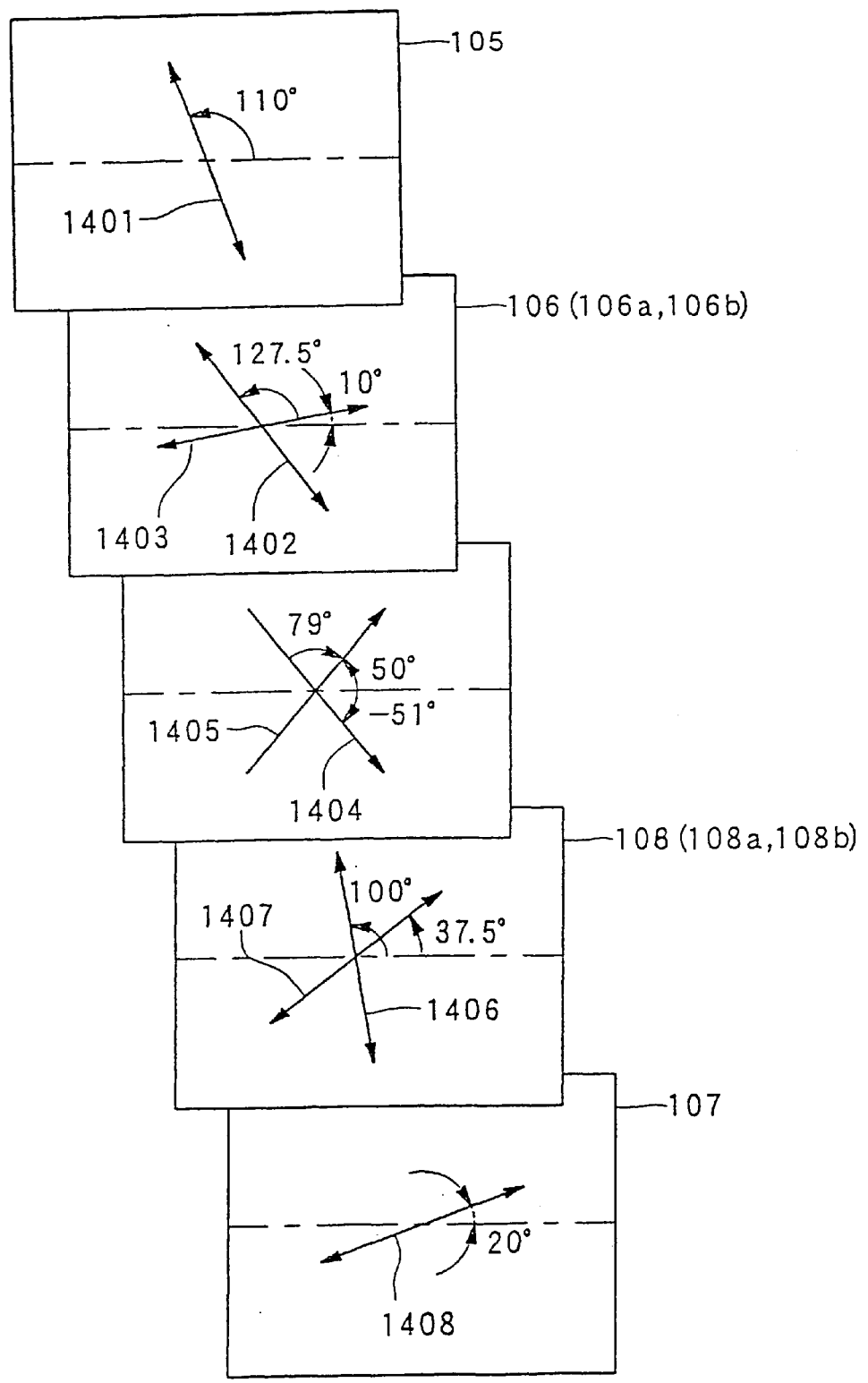
FIG. 4 is a conceptual diagram showing another example of a suitable optical characteristic setting pattern in the first embodiment.

FIGS. 3 and 4 show two concrete examples of the optical characteristics of the polarizing plate 105, the phase plate 106, the liquid crystal layer 103, the transflective plate 111, the polarizing plate 107 and the phase plate 108, which provide high contrast characteristic in both reflection type display and transmission type display as described above. In FIGS. 3 and 4, the five rectangles stacked together represent the polarizing plate 105, the phase plate 106, the liquid crystal cell containing the liquid crystal layer 103, etc., the phase plate 108 and the polarizing plate 107, in that order from above, the arrows in the rectangles represent the axial directions. Further, in the examples shown in FIGS. 3 and 4, the phase plate 106 above the liquid crystal cell is composed of two phase plates (hereinafter referred to as a first phase plate 106a and a second phase plate 106b), and, in the example shown in FIG. 4, the phase plate 108 below the liquid crystal cell is composed of two phase plates (hereinafter referred to as a third phase plate 108a and a fourth phase plate 108b).

In FIG. 3, the absorption axis 1301 of the polarizing plate 105 is at 35.5 degrees to the left with respect to the longitudinal direction of the panel. The slow axis direction 1302 of the first phase plate 106a is at 102.5 degrees to the left with respect to the longitudinal direction of the panel, and its retardation is 455 nm. The slow axis direction 1303 of the second phase plate 106b is at 48.5 degrees to the left with respect to the longitudinal direction of the panel, and its retardation is 544 nm. The rubbing direction 1304 of the alignment layer on the transparent substrate 101 side of the liquid crystal cell is 37.5 degrees to the right with respect to the longitudinal direction of the panel. The rubbing direction 1305 of the liquid crystal cell on the transparent substrate 102 side is 37.5 degrees to the left with respect to the longitudinal direction of the panel. The liquid crystal is twisted 255 degrees to the left from the transparent substrate 101 to the transparent substrate 102. Further, the product of the birefringence Δn of the liquid crystal and the cell gap d is 0.90 μm. The slow axis direction 1306 of the phase plate 108 is at 0.5 degrees to the right with respect to the longitudinal direction of the panel, and its retardation is 140 nm. The absorption axis 1307 of the polarizing plate 108 is at 49.5 degrees to the left with respect to the longitudinal direction of the panel. Under this condition, the light emitted from the backlight is a green light having a wavelength of 560 nm and in the form of an elliptically polarized light having an ellipticity of 0.85, which passes through the transflective plate 111 arranged in the liquid crystal cell. Further, it rotates to the right and is incident from the polarizing plate 105 side, passing through the liquid crystal layer in a dark display state to achieve substantially the same polarization state as the external light reflected by the transflective plate 111. Thus, by setting the optical characteristics as in this example, it is possible to achieve a high contrast characteristic in both reflection type display and transmission type display.

In FIG. 4, the absorption axis 1401 of the polarizing plate 105 is 110 degrees to the left with respect to the longitudinal direction of the panel. The slow axis direction 1402 of the first phase plate 106a is 127.5 degrees to the left with respect to the longitudinal direction of the panel, and its retardation is 270 nm. The slow axis direction 1403 of the second phase plate 106b is 10 degrees to the left with respect to the longitudinal direction of the panel, and its retardation is 140 nm. The rubbing direction 1404 of the alignment layer on the transparent substrate 101 side of the liquid crystal cell is 51 degrees to the right with respect to the longitudinal direction of the panel. The rubbing direction 1405 on the transparent substrate 102 side of the liquid crystal cell is 50 degrees to the left with respect to the longitudinal direction of the panel. The liquid crystal is twisted 79 degrees to the right from the transparent substrate 101 to the transparent substrate 102. Further, the product of the birefringence Δn of the liquid crystal and the cell gap d is 0.24 μm. The slow axis direction 1406 of the third phase plate 108a is 100 degrees to the left with respect to the longitudinal direction of the panel, and its retardation is 140 nm. The slow axis direction 1407 of the fourth phase plate 108b is 37.5 degrees to the left with respect to the longitudinal direction of the panel, and its retardation is 270 nm. The absorption axis 1408 of the polarizing plate 108 is 20 degrees to the left with respect to the longitudinal direction of the panel. Under this condition, the light emitted from the backlight is in a relatively wide wavelength range around green light having a wavelength of 560 nm and in the form of an elliptically polarized light which has a maximum ellipticity of 0.96, which is quite akin to that of circularly polarized light. In such state, the light emitted from the back light passes through the transflective plate 111 arranged in the liquid crystal cell. Further, its rotating direction is to the left, and the light is incident from the polarizing plate 105 side, passing through the liquid crystal layer in the dark display state to achieve substantially the same polarization state as the external light reflected by the transflective plate 111. Thus, by setting the optical characteristics as in the case of this example, it is possible to obtain high contrast characteristic in both reflection type display and transmission type display.

As described above with reference to FIGS. 3 and 4, in the liquid crystal device of the present invention, there are provided the polarizing plate 105 and the phase plate 106 as well as the polarizing plate 107 and the phase plate 108, so that it is possible to achieve a satisfactory color compensation and high contrast characteristic in both reflection type display and transmission type display. The setting of these optical characteristics is not restricted to that shown in FIGS. 3 and 4; it is possible to effect setting consistent with the brightness and contrast ratio required in terms of the specifications of the liquid crystal device by experiment, theoretically, by simulation, etc.

Next, the reflection type display and transmission type display in this embodiment, constructed as described above, will be described with reference to FIG. 1.

First, in the case of reflection type display, external light incident on this liquid crystal device from above as seen in the drawing is transmitted through the polarizing plate 105 and the phase plate 106, and passes through the liquid crystal layer 103 and the color filter 114, and is then reflected by the transflective plate 111 as an example of the transflective layer before it is emitted from the polarizing plate 105 again. At this time, it is possible to control the bright state and dark state and the intermediate state by the voltage applied to the liquid crystal layer 103.

Further, in the case of transmission type display, the light from the backlight becomes a predetermined polarized light by the polarizing plate 107 and the phase plate 108 and is introduced into the color filter 114 and the liquid crystal layer 103 through the minute openings of the transflective plate 103; then, after passing through the liquid crystal layer 103, it is transmitted through the phase plate 106. At this time, it is possible to control the state (the bright state) in which the light is transmitted through the polarizing plate 105, the state (the dark state) in which it is thereby absorbed, and the intermediate state (brightness) according to the voltage applied to the liquid crystal layer 103.

In the construction of this embodiment as described above, it is possible to realize a color liquid crystal device which is capable of switching between a reflection type display and transmission type display which are free from a double image or smearing. Further, an Al metal layer having openings is used as the transflective plate 111 of this embodiment, and its surface is covered with the protective layer 112, and thereon is provided with the color filter 114, the protective layer 115, the transparent electrode 116, etc. Thus, the Al metal layer is not brought into direct contact with the ITO developer, the color filter developer or the like, so that the Al metal layer is not dissolved by the developer. Further, it is possible to make the Al metal layer, which is subject to flaws, easy to handle. This transflective plate 111 preferably contains 95% or more by weight of Al and has a thickness of not less than 10 nm and not more than 40 nm.

SECOND EMBODIMENT

Figure 5:
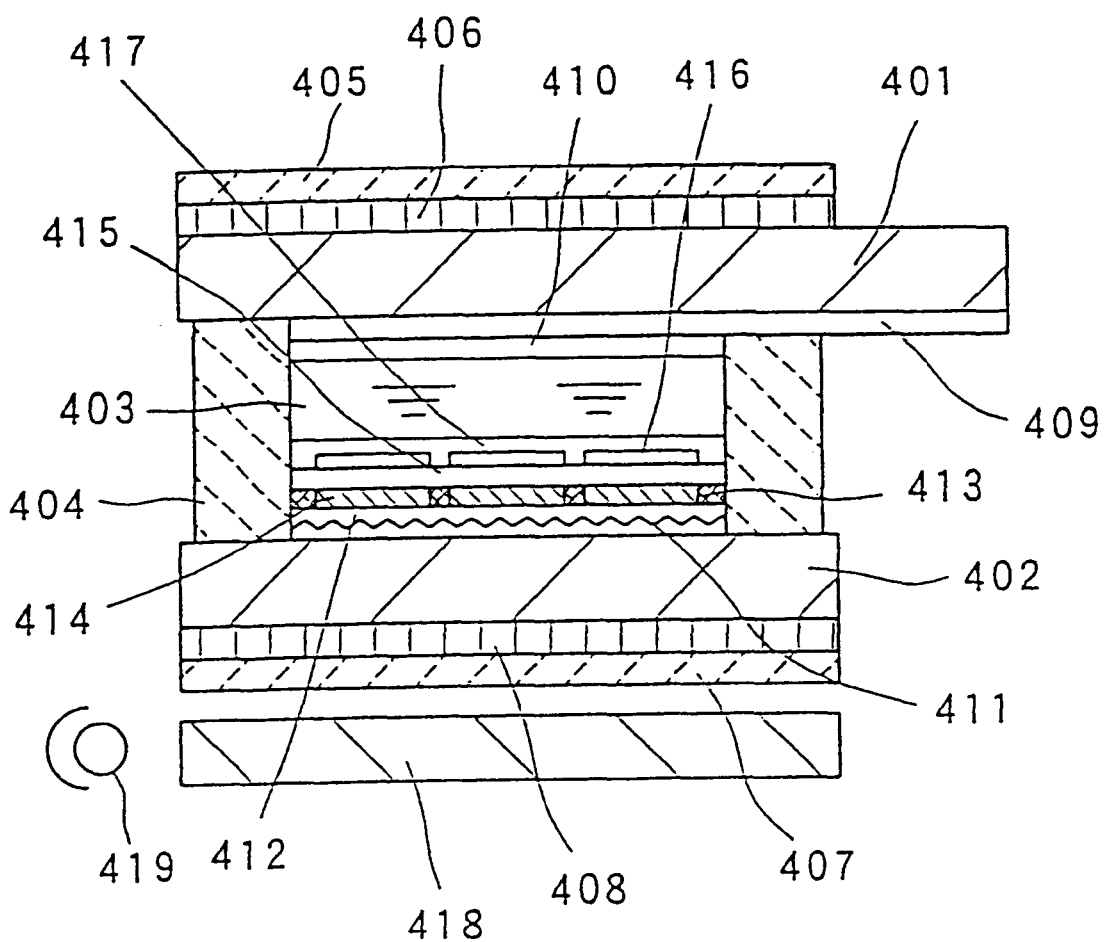
FIG. 5 is a schematic longitudinal sectional view showing the construction of a liquid crystal device according to a second embodiment of the present invention.

A second embodiment of the liquid crystal device of the present invention will be described with reference to FIGS. 5 and 6. FIG. 5 is a schematic longitudinal sectional view showing the construction of the second embodiment of the liquid crystal of the present invention. While this embodiment basically relates to a passive matrix type liquid crystal display device, a similar construction is also applicable to an active matrix type device, other segment type devices and other liquid crystal devices.

In this embodiment, a liquid crystal layer 403 is held between two transparent substrates 401 and 402 and sealed by a frame-like sealing material 404 to form a liquid crystal cell. The liquid crystal cell 403 is formed by a nematic liquid crystal whose dielectric anisotropy is negative. On the inner surface of the upper transparent substrate 401, there are formed a plurality of stripe-like transparent electrodes 409 consisting of ITO or the like; on the surface of the transparent electrodes 409, there is formed an alignment layer 410 for vertically aligning the liquid crystal, which has undergone rubbing processing in a predetermined direction. Due to this rubbing processing, the liquid crystal molecule has a pre-tilt angle of approximately 85 degrees in the rubbing direction. In the case of an active matrix type device equipped with an MIM element, TFT element or the like, the transparent electrodes 409 are formed in a rectangular configuration, and connected to wiring through the active element.

On the other hand, on the inner surface of the lower transparent substrate 402, there are formed protrusions and recesses of a photosensitive acrylic resin having a difference in height of approximately 0.8 $\mu$m, and, on the surface thereof, an Al layer to which 1.0% by weight of Nd is added and which has a thickness of 25 nm is formed by sputtering to form a transflective plate 411. On this transflective plate 411, there is formed through the intermediation of a protective layer 412 a color filter 414, in which color layers of R (red), G (green) and B (blue) are arranged in a predetermined pattern. The surface of a color filter 414 is covered with a transparent protective layer 415, and, on the surface of this protective layer 415, there are formed stripe-like transparent electrodes 416 consisting of ITO or the like. The plurality of stripe-like transparent electrodes 416 respectively formed for each color layer of the color filter 414 are arranged so as to cross the transparent electrodes 409. On the surface of the transparent electrodes 416, there is formed an alignment layer 417. This alignment layer 417 is not subjected to rubbing processing.

On the outer surface of the upper transparent substrate 401, there is arranged a polarizing plate 405, and a phase plate (¼ wavelength plate) 406 is arranged between the polarizing plate 405 and the transparent substrate 401. Below the liquid crystal cell, a phase plate (¼ wavelength plate) 408 is arranged behind the transparent substrate 402, and, behind the phase plate (¼ wavelength plate) 408, there is arranged a polarizing plate 407. At rearward positions with respect to the polarizing plate 407, there is arranged a backlight having a fluorescent tube 419 emitting white light and a light guide plate 418 equipped with an incident end surface extending along the fluorescent tube 419. The light guide plate 418 is a transparent body consisting of an acrylic resin plate or the like, and on the entire back surface thereof, a roughened surface for scattering or a print layer for scattering is formed. It receives the light from the fluorescent tube 419 serving as the light source at its end surface and emits a substantially uniform light from the upper side in the drawing. It is also possible to use an LED (light emitting diode), an EL (electroluminescence) or the like as the back light.

In this embodiment, a black matrix layer 413, which is a light shielding portion formed between the color layers of the color filter 414, is provided substantially in two-dimensional correspondence in order to prevent light from leaking from the regions between the dots at the time of transmission type display. The black matrix layer 413 is formed by coating with a Cr layer, or it is formed of a photosensitive black resin.

Figure 6A:
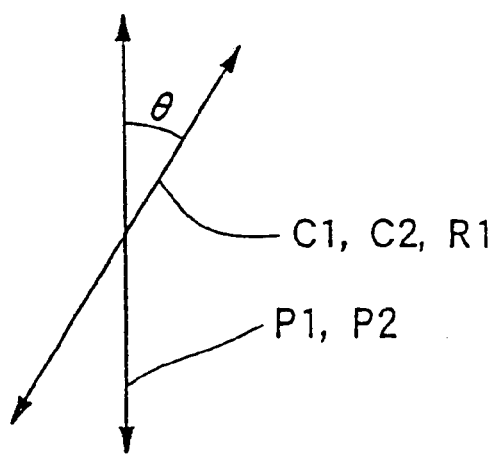
FIG. 6a is a diagram illustrating the relationship between the rubbing directions of a polarizing plate, a phase plate and a liquid crystal cell of the second embodiment.

As shown in FIG. 6*a*, the transmission axes P1 and P2 of the polarizing plates 405 and 407 are set in the same direction, and the direction of the slow phase axes C1 and C2 of the phase plates (¼ wavelength plates) 406 and 408 is rotated clockwise by $\theta=45$ degrees with respect to the transmission axes P1 and P2 of these polarizing plates. Further, the direction R1 of the rubbing processing of the alignment layer 410 on the inner surface of the transparent substrate 401 is also set in a direction which coincides with the direction of the slow phase axes C1 and C2 of the phase plates (¼ wavelength plates) 406 and 408. This rubbing direction R1 determines the direction in which the major axis of the liquid crystal molecule falls at the time of the application of the electric field to the liquid crystal layer 403. A negative nematic liquid crystal is used in the liquid crystal layer 403.

Figure 6B:
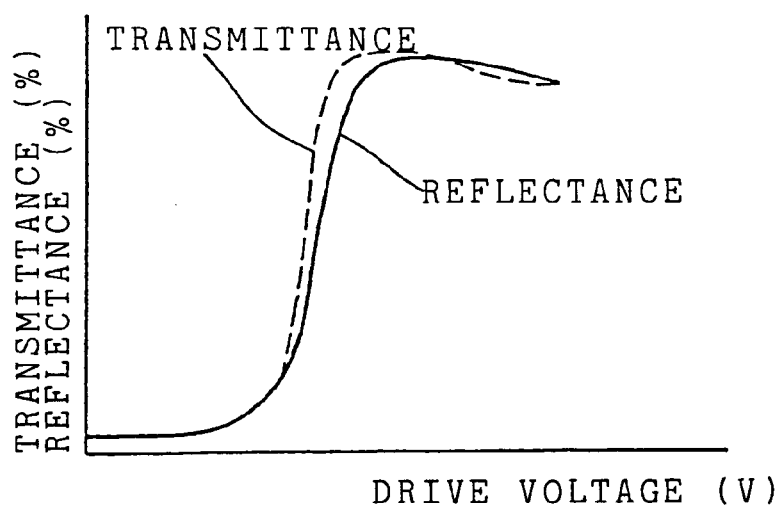

FIG. 6*b* shows the drive voltage characteristic of the reflectance R in reflection type display and the drive voltage characteristic of the transmittance T in transmission type display in this embodiment. The display condition when no electric field is applied is dark (black). When this liquid crystal cell is used, there is no need to form the black matrix layer 413.

Next, the reflection type display and the transmission type display in this embodiment, constructed as described above, will be described with reference to FIG. 5.

First, in the case of reflection type display, the external light incident on the liquid crystal device from above as seen in the drawing is transmitted through the polarizing plate 405 and the phase plate 406; then, after passing the liquid crystal layer 403, it passes through the color filter 414 and is reflected by the transflective plate 411 before it is emitted from the polarizing plate 405 again. At this time, the bright state, the dark state and the intermediate state are controlled according to the voltage applied to the liquid crystal layer 403.

In the case of transmission type display, the light from the backlight is turned into a predetermined polarized light by the polarizing plate 407 and the phase plate 408, and introduced into the liquid crystal layer 403 from the transflective plate 411; then, after passing through the color filter 414 and the liquid crystal layer 403, it is transmitted through the phase plate 406. At this time, it is possible to control, from the polarizing plate, the transmitted (bright) state, the absorbed (dark) state and the intermediate state in brightness, according to the voltage applied to the liquid crystal layer 403.

In the above-described construction of this embodiment, it is possible to realize a color liquid crystal device capable of switching between a reflection type display and transmission type display free from a double image or smeared image.

Further, a metal layer mainly composed of Al is used for the transflective plate 411 of this embodiment, and its surface is covered with the protective layer 412, forming the color filter 414, the protective layer 415 and the transparent electrode 416 thereon. Thus, the Al metal layer is not brought into direct contact with ITO developer, color filter developer, etc., so that the Al metal layer is not dissolved by the developer. Further, it is possible to make the Al metal layer, which is subject to flaws, easy to handle. For example, an Al layer to which 1.0% by weight of Nd is added and which has an thickness of 25 nm exhibits a reflectance of 80% and a transmittance of 10%, sufficiently functioning as the transflective plate 411.

A transflective plate 411 provided with protrusions and recesses is capable of reflecting light at wide angles, so that a liquid crystal device of wide angle of view is realized.

THIRD EMBODIMENT

Figure 7:
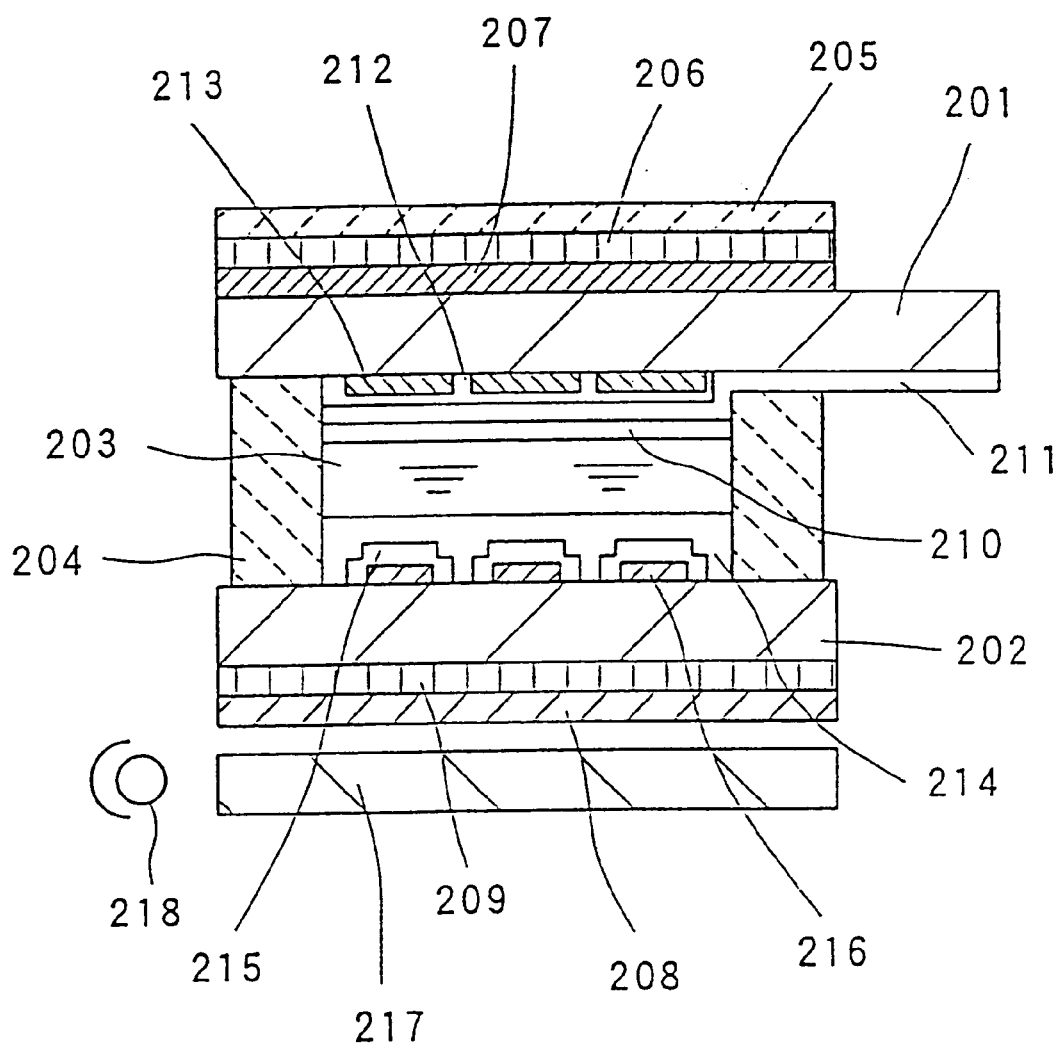
FIG. 7 is a schematic longitudinal sectional view showing the construction of a liquid crystal device according to a third embodiment of the present invention.

A third embodiment of the liquid crystal device of the present invention will be described with reference to FIGS. 7 through 10. FIG. 7 is a schematic longitudinal sectional view showing the construction of the third embodiment of the liquid crystal device of the present invention. While this embodiment basically relates to a passive matrix type liquid crystal device, a similar construction is also applicable to an active matrix type device, other segment type devices and other liquid crystal devices.

In this embodiment, a liquid crystal layer 203 is sealed between two transparent substrates 201 and 202 by a frame-like sealing material 204 to form a liquid crystal cell. The liquid crystal layer 203 is formed of a nematic liquid crystal having a predetermined twist angle. On the inner surface of the upper transparent substrate 201, there is formed a color filter 213, in which color layers of R (red), G (green) and B (blue) are arranged in a predetermined pattern. The surface of the color filter 213 is covered with a transparent protective layer 212, and thereon, a plurality of stripe-like transparent electrodes 211 are formed by using ITO or the like. An alignment layer 210 is formed on the surface of the transparent electrodes 211, and rubbing processing is performed thereon in a predetermined direction.

On the other hand, on the inner surface of the lower transparent substrate 202 and on the stripe-like reflection layers 216 respectively formed for each color layer of the color filter 213, a plurality of stripe-like transparent electrodes 215 having a larger area than the stripe-like reflection layers 216 are arranged so as to cross the transparent electrodes 211. In the case of an active matrix type device equipped with an MIM element, TFT element or the like, each reflection layer 216 and each transparent electrode 215 is formed in a rectangular configuration, and connected to wiring through an active element. These reflection layers 216 are formed of Cr, Al or the like, and their surface constitute a reflecting surface reflecting light incident from the transparent substrate 201 side. On the surface of the transparent electrodes 215, an alignment layer 214 is formed, on which rubbing processing is performed in a predetermined direction.

In this way, in the third embodiment, an example of the transflective layer is formed from the reflection layers 216 arranged in a stripe-like fashion at predetermined intervals. In this case, the gaps between the adjacent stripe-like reflection layers 216 serve to allow the light source light from the backlight to be transmitted.

A polarizing plate 205 is arranged on the outer surface of the upper transparent substrate 201, and a phase plate 206 and a scattering plate 207 are arranged between the polarizing plate 205 and the transparent substrate 201. Further, below the liquid crystal cell, a phase plate 209 is arranged behind the transparent substrate 202, and a polarizing plate 208 is arranged behind the phase plate 209. Below the polarizing plate 208, there is arranged a backlight having a fluorescent tube 218 emitting white light and a light guide plate 217 equipped with an incident end surface extending along the fluorescent tube 218. The entire back surface of the light guide plate 217 is formed as a roughened surface for scattering, or it is a transparent member consisting of an acrylic resin plate or the like on which a print layer for scattering is formed; it receives the light from the fluorescent tube 218 serving as the light source at its end surface, and emits a substantially uniform light from the upper side in the drawing. It is also possible to use LED (light emitting diode), EL (electroluminescence), etc. as the backlight.

Next, with reference to FIG. 7, the reflection type display and transmission type display in this embodiment, constructed as described above, will be described.

First, in the case of reflection type display, the external light incident from above as seen in the drawing is transmiitted through the polarizing plate 205, the phase plate 206 and the scattering plate 207, and, after passing through the color filter 213 and the liquid crystal layer 203, is reflected by the reflection layer 216 before it is emitted from the polarizing plate 205 again. At this time, it is possible to control the bright state, the dark state and the intermediate state according to the voltage applied to the liquid crystal layer 203.

In the case of transmission type display, the light from the backlight is turned into a predetermined polarized light by the polarizing plate 208 and the phase plate 209, and introduced into the liquid crystal layer 203 and the color filter 213 from the gap portion where the reflection layer 216 is not formed. After this, it is transmitted through the scattering plate 207 and the phase plate 206. At this time, it is possible to control the state (bright state) in which the light is transmitted through the polarizing plate 205, the state (dark state) in which it is thereby absorbed, and the intermediate (brightness) state according to the voltage applied to the liquid crystal layer 203.

Figure 8:
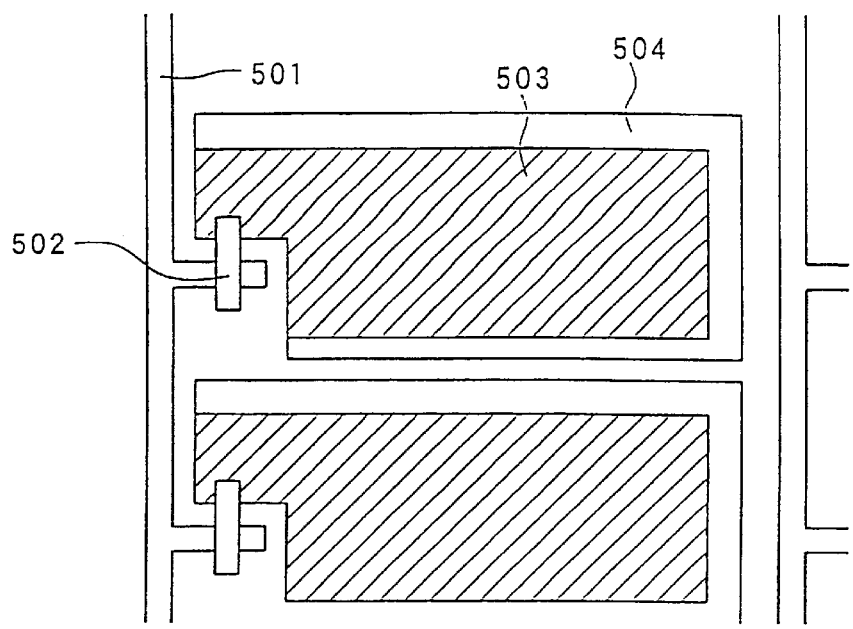
FIG. 8 is a plan view showing an example of a transflective layer comprising reflecting layers arranged with gaps in the liquid crystal device of the third embodiment of the present invention.
Figure 9:
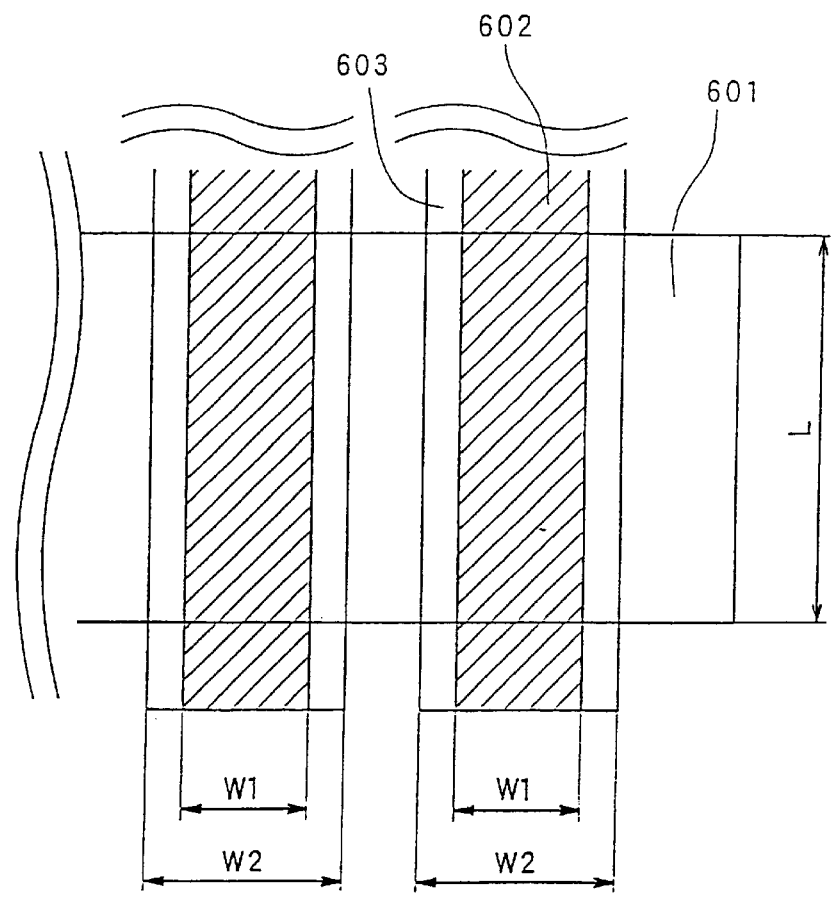
FIG. 9 is a plan view showing another example of the transflective layer comprising reflecting layers arranged with gaps in the third embodiment.
Figure 10:
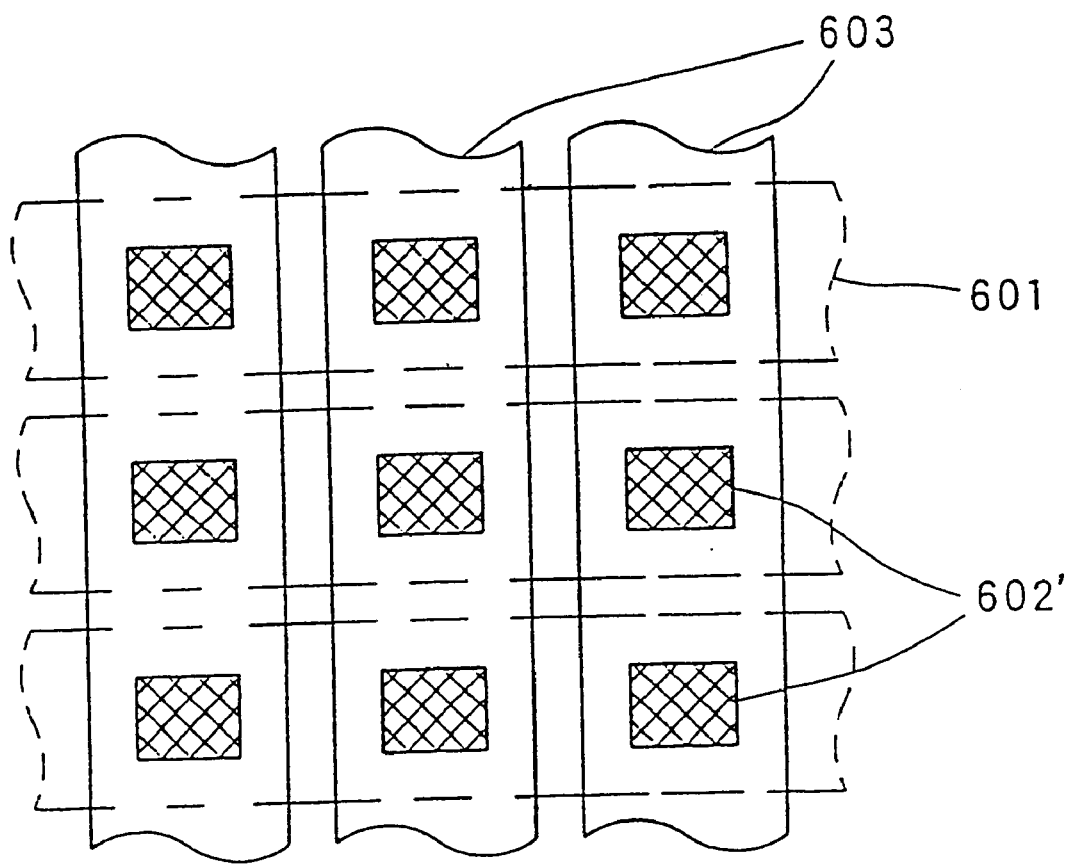
FIG. 10 is a plan view showing another example of the transflective layer comprising reflecting layers arranged with gaps in the third embodiment.

Here, the reflection type display and transmission type display will be described in more detail with reference to FIGS. 8 through 10. FIG. 8 is a schematic front view of the lower transparent substrate 202 when the present invention is applied to an active matrix type liquid crystal device using an MIM element. An MIM element (or TFD element) 502 connected to a scanning line 501 is stacked on an island-like Al reflection layer 503 and connected to an ITO transparent electrode 504 having an area larger than that of the Al reflection layer 503. FIG. 9 is a schematic front view of an example of the lower transparent substrate 202 when the present invention is applied to a passive matrix type liquid crystal device. On the inner surface of the lower transparent substrate, there are formed Al reflection layers 602 and stripe-like ITO transparent electrodes 603 having an area larger than that of the Al reflection layers 602 in such a manner that they cross a stripe-like ITO transparent electrode 601 formed on the inner surface of the upper transparent substrate of the liquid crystal cell. FIG. 10 is a schematic front view of another example of the lower transparent substrate 202 when the present invention is applied to a passive matrix type liquid crystal device. On the inner surface of the lower transparent substrate, stripe-like ITO transparent electrodes 603 having a width larger than that of each side of the island-like Al reflection layers 602' are formed in such a manner that they cross stripe-like ITO transparent electrodes 601 formed on the inner surface of the upper transparent substrate of the liquid crystal cell.

At the time of reflection type display, the external light incident on the liquid crystal cell is reflected by the reflection layers 503 (in the case of FIG. 8), the reflection layers 602 (in the case of FIG. 9) or the reflection layers 602' (in the case of FIG. 10). That is, only that portion of the external light which is incident on the reflection layers 503, 602 or 602' is modulated by the voltage applied to the liquid crystal layer. In transmission type display, of the light incident on the liquid crystal cell from the backlight, the light passed through the gap of the reflection layers 503, 602 or 602' is introduced into the liquid crystal layer. However, the light incident on the portions other than the pixel electrodes or dot electrodes has nothing to do with display, and only deteriorates the contrast in transmission type display, so that it is cut off by utilizing a light shielding layer (black matrix layer) or by making the display mode of the liquid crystal layer normally black. That is, transmission type display is made possible by the light, which is emitted from the backlight and then incident on the portion of the ITO transparent electrode 504 or 603 which does not overlap the Al reflection layers 503, 602 or 602'.

For example, assuming that the line width (L) of the ITO transparent electrode 601 on the inner surface of the upper transparent substrate in FIG. 9 is 198 $\mu$m, that the line width (W1) of the Al reflection layers 602 on the inner surface of the lower substrate is 46 $\mu$m, and that the line width (W2) of the ITO transparent electrodes 603 formed thereon is 56 $\mu$m, approximately 70% of the external light introduced into the liquid crystal layer can be reflected, and approximately 10% of the light emitted from the backlight and introduced into the lower transparent substrate can be transmitted.

In the construction of this embodiment described above, it is possible to realize a color liquid crystal device capable of switching between a reflection type display and a transmission type display free from a double image or smeared image.

Further, in this embodiment, the ITO transparent electrode 215 is formed on the surface of the Al reflection layer, so that the Al reflection layer 216 is not easily subject to flaws. Further, since the Al reflection layer 216 and the ITO transparent electrode 215 constitute an electrode line, it is possible to reduce the resistance of the electrode line.

Further, the scattering plate 207 arranged on the upper surface of the liquid crystal cell can emit the light reflected by the Al reflection layer 216 in a wide angle, so that a liquid crystal device of a wide angle of view can be realized.

FOURTH EMBODIMENT

A fourth embodiment of the liquid crystal device of the present invention will be described with reference to FIG. 11. FIG. 11 is a schematic longitudinal sectional view showing the construction of the fourth embodiment of the liquid crystal device of the present invention. While this embodiment basically relates to a passive matrix type liquid crystal display device, a similar construction is applicable to an active matrix type device, other segment type devices, and other liquid crystal devices.

In this embodiment, as in the above cases, a liquid crystal layer 303 is sealed between two transparent substrates 301 and 302 by a frame-like sealing material 304 to form a liquid crystal cell. The liquid crystal layer 303 is formed of a nematic liquid crystal having a predetermined twist angle. On the inner surface of the upper transparent substrate 301, a color filter 313 is formed, and, in this color filter 313, color layers of three colors R (red), G (green) and B (blue) are arranged in a predetermined pattern. The surface of the color filter 313 is covered with a protective layer 312, and, on the surface of this protective layer 312, a plurality of stripe-like transparent electrodes 311 are formed by using ITO or the like. On the surface of the transparent electrode 311, an alignment layer 310 is formed, on which rubbing processing is performed in a predetermined direction.

On the other hand, on the inner surface of the lower transparent substrate 302, stripe-like reflection layers 317 are respectively formed for the color layers of the color filter 313, and, on the reflection layers 317, stripe-like transparent electrodes 315 having an area larger than that of the reflection layers 317 are formed through the intermediation of a protective layer 316. A plurality of them are arranged so as to cross the transparent electrodes 311. In the case of an active matrix type device equipped with an MIM element, TFT element etc., the reflection layers 317 and the transparent electrodes 315 are formed in a rectangular configuration, and connected to wiring through an active element. The reflection layers 317 are formed of Cr, Al or the like and their surface constitutes a reflection surface reflecting light incident from the transparent substrate 301 side. On the surface of the transparent electrodes 315, an alignment layer 314 is formed, on which rubbing processing is performed in a predetermined direction.

In this way, in the fourth embodiment, an example of the transflective layer is formed by the reflection layers 317 arranged in a stripe-like manner with predetermined intervals; in this case, the gaps between the adjacent stripe-like reflection layers 317 serve to transmit the light source light from the backlight.

A polarizing plate 305 is arranged on the outer surface of the upper transparent substrate 301, and a phase plate 306 and a scattering plate 307 are arranged between the polarizing plate 305 and the transparent substrate 301. Further, below the liquid crystal cell, a phase plate 309 is arranged behind the transparent substrate 302, and a polarizing plate 308 is arranged behind the phase plate 309. Below the polarizing plate 308, there is arranged a backlight, which has a luminescent tube 319 emitting white light and a light guide plate 318 equipped with an incident end surface extending along the luminescent tube 319. The entire back surface of the light guide plate 318 is formed as a roughened surface for scattering, or it is a transparent member consisting of an acrylic resin plate or the like on which a print layer for scattering is formed; it receives the light from the luminescent tube 319 serving as the light source and emits a substantially uniform light from the upper side in the drawing. It is also possible to use LED (light emitting diode), EL (electroluminescence) or the like as the backlight.

Next, the reflection type display and transmission type display in this embodiment, constructed as described above, will be described with reference to FIG. 11.

First, in the case of reflection type display, the external light incident on the liquid crystal device from above as seen in the drawing is transmitted through the polarizing plate 305, the phase plate 306, and the scattering plate 307; after passing the color filter 313 and the liquid crystal layer 303, it is reflected by the reflection layer 317 before it is emitted from the polarizing plate 305 again. At this time, it is possible to control the bright state, the dark state and the intermediate state according to the voltage applied to the liquid crystal layer 303.

In the case of transmission type display, the light from the backlight is turned into a predetermined polarized light by the polarizing plate 308 and the phase plate 309 and is introduced into the liquid crystal layer 303 and the color filter 313 from the portion where the reflection layer 317 is not formed; after this, it is transmitted through the scattering plate 307 and the phase plate 306. At this time, it is possible to control the state (bright state) in which the light is transmitted through the polarizing plate 305, the state (dark state) in which it is thereby absorbed, and the intermediate state according to the voltage applied to the liquid crystal layer 303.

As in the case of the third embodiment, regarding the planar configurations of the transparent electrodes 315 and the reflection layers 317, they are as shown in FIG. 8 when the embodiment is applied to an active matrix type liquid crystal device using an MIM element; when it is applied to a passive matrix type liquid crystal device, they are as shown in FIGS. 9 and 10.

For example, assuming that, in FIG. 9, the line width (L) of the ITO transparent electrode 601 on the inner surface of the upper transparent substrate is 240 µm, that the line width (W1) of the Al reflection layers 602 on the inner surface of the lower substrate is 60 µm, and that the line width (W2) of the ITO transparent electrodes 603 formed thereon through the intermediation of the protective layer is 70 µm, approximately 75% of the external light introduced into the liquid crystal layer can be reflected, and approximately 8% of the light emitted from the backlight and introduced into the lower transparent substrate can be transmitted.

In the construction of this embodiment as described above, it is possible to realize a color liquid crystal device capable of switching between a reflection type display and a transmission type display free from a double image or smeared image.

Further, in this embodiment, the ITO transparent electrodes 315 are formed after forming the protective layer 316 on the surface of the Al reflection layers 317, so that the Al reflection layers 317 are not brought into direct contact with the developer or etching liquid of the ITO transparent electrodes 315. Further, due to the presence of the protective layer 316, they are not easily subject to flaws. By short-circuiting the Al reflection layers 317 and the ITO transparent electrodes 315, the probability of disconnection can be reduced and, at the same time, the resistance of the electrode line can be reduced.

Further, since the scattering plate 307 arranged on the upper surface of the liquid crystal cell can emit the light reflected by the Al reflection layers 317 at a wide angle, it is possible to realize a liquid crystal device of a wide angle of view.

FIFTH EMBODIMENT

A fifth embodiment of the liquid crystal device of the present invention will be described with reference to FIG. 12. FIG. 12 is a schematic longitudinal sectional view showing the construction of the fifth embodiment of the liquid crystal device of the present invention. The fifth embodiment has substantially the same construction as the fourth embodiment described above except for the construction of the reflection layers. In FIG. 12, the components which are the same as those of the fourth embodiment shown in FIG. 11 are indicated by the same reference numerals, and a description of such components will be omitted.

Referring to FIG. 12, the reflection layers 317' are formed as follows:

First, a photosensitive resist is applied to the inner surface of the transparent substrate 302 by spin coating or the like, and exposed with a light quantity adjusted through a mask having minute openings.

After this, the photosensitive resist is baked as needed before performing development. Through development, the portion corresponding to the openings of the mask is partially removed and a support layer having a wave-like sectional configuration is formed. Here, it is possible to exclusively remove the portion corresponding to the openings of the mask by the above photolithography process, or to exclusively leave the portion corresponding to the openings of the mask before smoothing the protrusions and recesses by etching, heating, etc. to form a wave-like sectional configuration. Further, it is also possible to stack still another layer on the surface of the above-mentioned support layer once formed to make the surface smoother.

Further, the surface of the support layer is coated with a thin metal layer by evaporation, sputtering, etc. to form a metal layer equipped with a reflection surface. After this, patterning is effected in a stripe-like manner (See FIG. 9) or an island-like manner (See FIG. 8 or 10). The metal used is Al, Cr, Ag, Au, etc. The reflection layers 317' are formed in response to the wave-like configuration of the surface of the support layer, so that the surface is generally formed as a roughened surface.

In the construction of this embodiment as described above, it has been made possible to realize a color liquid crystal device capable of switching between a reflection type display and a transmission type display free from a double image or smeared image.

In particular, in this embodiment, the reflection layers 317' provided with protrusions and recesses can reflect the reflected light at a wide angle, so that it is possible to realize a liquid crystal device of a wide angle of view.

SIXTH EMBODIMENT

Figure 13A:
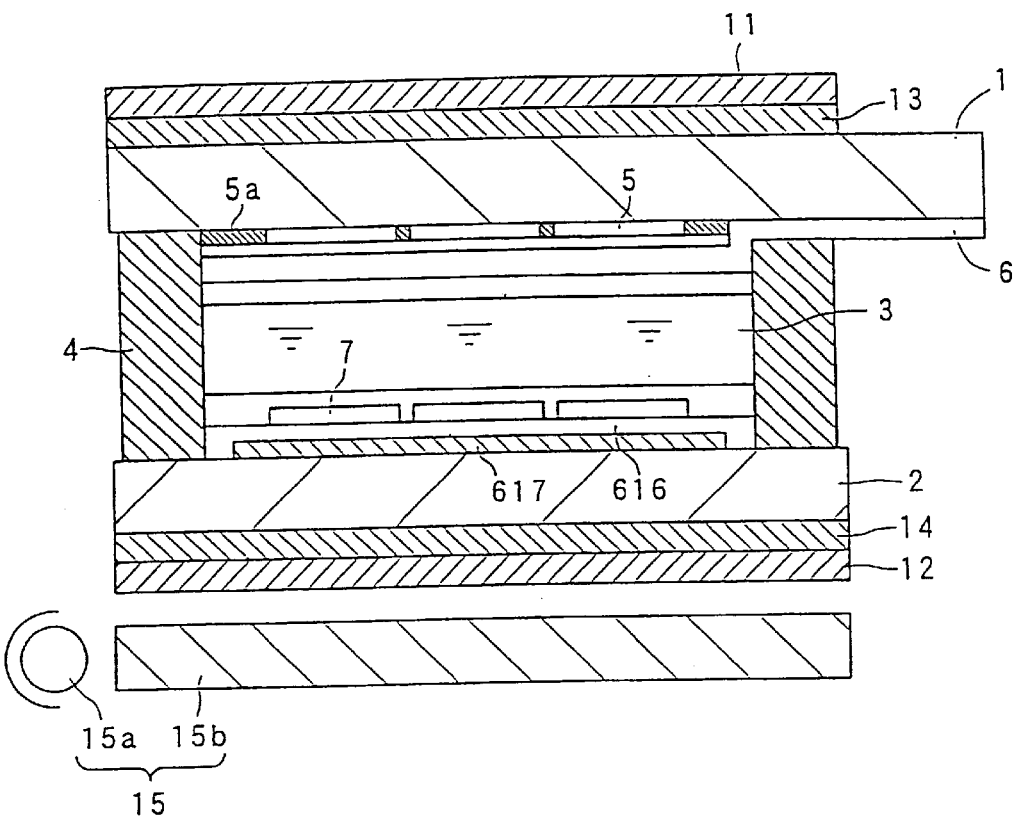
FIG. 13a is a schematic longitudinal sectional view showing the construction of a liquid crystal device according to a sixth embodiment of the present invention.
Figure 13B:
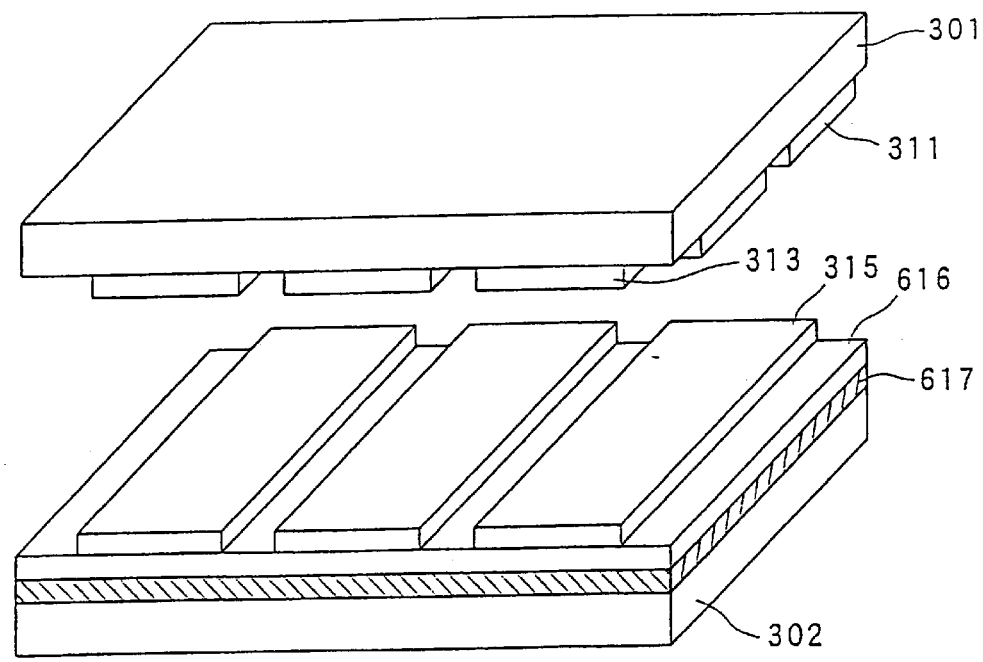

A sixth embodiment of the liquid crystal device of the present invention will be described with reference to FIGS. 13a and 13b. FIG. 13a is a schematic longitudinal sectional view of the sixth embodiment of the liquid crystal device of the present invention, and FIG. 13b is a partial perspective view thereof. The sixth embodiment has substantially the same construction as that of the above-described fourth embodiment except for the construction of the reflection layer and the protective layer thereof. In FIGS. 13a and 13b, the components which are the same as those of the fourth embodiment shown in FIG. 11 are indicated by the same reference numerals and a description thereof will be omitted.

In FIGS. 13a and 13b, the reflection layer 617 is formed by evaporation as a reflection layer consisting of aluminum having a thickness of 50 to 300 nm and provided for each dot in an island-like manner or in a stripe-like manner (See FIGS. 8 through 10). While it is desirable to use aluminum for the reflection layer 617, it is also possible to use other metals such as chromium.

Further, on the reflection layer 617, no protective layer is formed as in the fourth embodiment, and an insulating layer 616 consisting of $Al_2O_3$ (aluminum oxide) is formed by anodizing the reflection layer after evaporation. The anodic oxidation is performed by using a solution containing 1 to 10% by weight of ammonium salicylate and 20 to 80% by weight of ethylene glycol under the condition of a formation voltage of 5 to 250 V and a current density of 0.001 to 0.1 mA/cm². When the thickness of the oxide layer thus formed is 140 nm or an integral multiple thereof, it is possible to prevent the generation of coloring due to interference. On the insulating layer 616, there are arranged transparent electrodes 315. Otherwise, the construction of this embodiment is the same as that of the fourth embodiment shown in FIG. 11.

As described above, in the sixth embodiment, it is possible to obtain an insulating layer 616 which is very thin and of high insulation performance. In particular, by forming the reflection layer 617 of aluminum, it is possible to maintain the reflectance after oxidation. When thus forming the insulating layer 616 by oxidation, it is possible to utilize anodic oxidation or thermal oxidation.

SEVENTH EMBODIMENT

Figure 14:
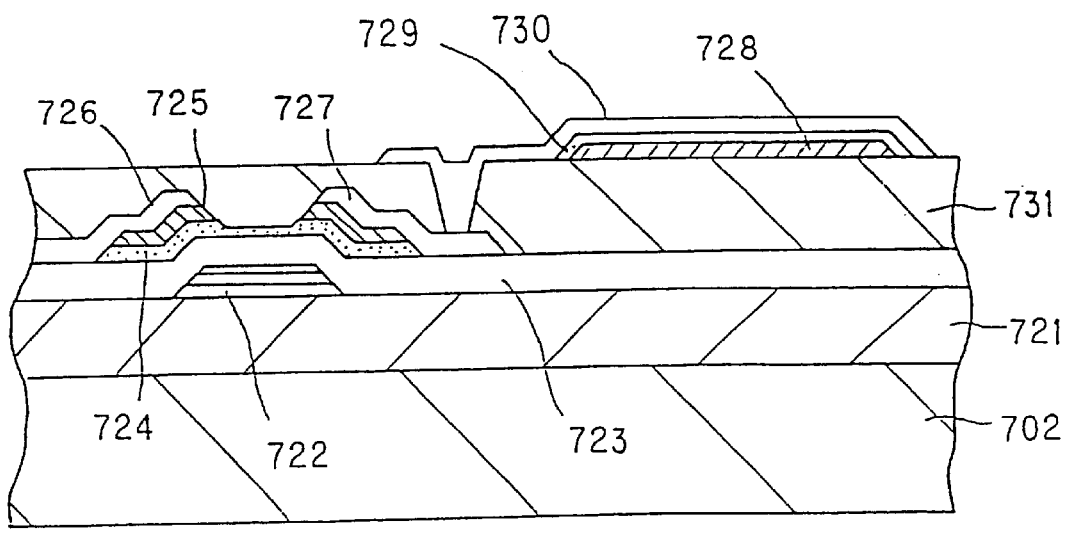
FIG. 14 is a sectional view showing a TFT drive element in a seventh embodiment of the present invention with a pixel electrode, etc.

A seventh embodiment of the liquid crystal device of the present invention will be described with reference to FIG. 14. FIG. 14 is an enlarged sectional view showing the TFT drive element in the seventh embodiment with a pixel electrode, etc. The construction of the seventh embodiment in which a TFT drive element is formed on a substrate and connected to a transparent electrode formed thereon through the intermediation of an insulating layer is applicable to the embodiments of the present invention.

In FIG. 14, on an inter-layer insulating layer 721 formed on a transparent substrate 702, there is provided a TFT element having a gate electrode 722, a gate insulating layer 723, an i-Si layer 724, an n$^+$-Si layer 725, a source electrode 726 and a drain electrode 727. A reflection layer 728 consisting of aluminum is formed on an inter-layer insulating layer 731 formed on the TFT element and, on the reflection layer 728, an insulating layer 729 is provided which is formed through anodic oxidation of the reflection layer after evaporation. On the insulating layer 729, there is formed a transparent electrode 730 (pixel electrode) consisting of ITO connected to the drain electrode 727 through a contact hole.

As described above, in the seventh embodiment, electricity is supplied to each transparent electrode (pixel electrode) 730 through the TFT element, so that it is possible to reduce crosstalk between the transparent electrodes 730, and an image display with better quality can be realized. The TFT element thus constructed may be a TFT of LDD construction, offset construction, self-alignment construction, etc. Further, apart from the single gate construction, it is also possible to adopt a construction with a dual gate or a triple gate or more.

EIGHTH EMBODIMENT

Figure 15:
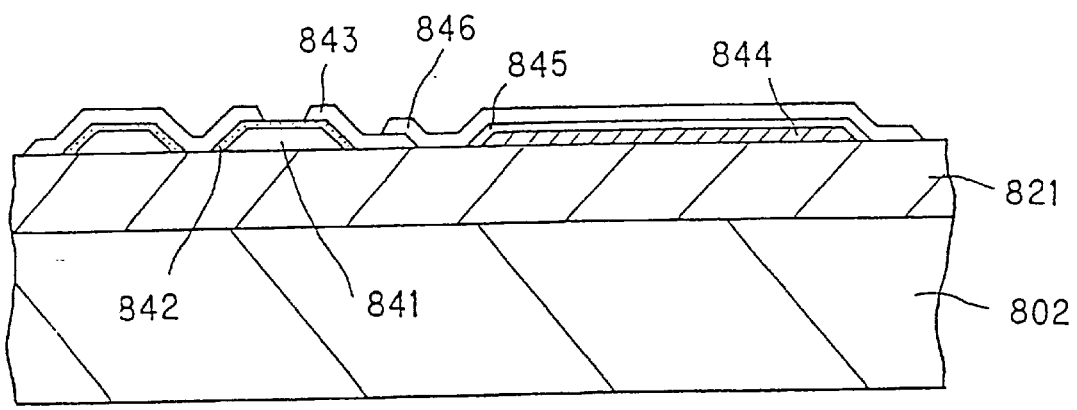
FIG. 15 is a sectional view showing a TFD drive element in an eighth embodiment of the present invention with a pixel electrode, etc.

An eighth embodiment of the liquid crystal device of the present invention will be described with reference to FIG. 15. FIG. 15 is an enlarged sectional view showing a TFD drive element in the eighth embodiment with a pixel electrode, etc. The construction of the eighth embodiment in which a TFD drive element is formed on a substrate and connected to a transparent electrode formed thereon through the intermediation of an insulating layer is applicable to the embodiments of the present invention.

In FIG. 15, a first conductive layer 841 consisting of tantalum is formed on an inter-layer insulating layer 821 formed on a substrate 802 and, on the first conductive layer 841, there is formed an insulating layer 842 obtained through anodic oxidation of tantalum. On the insulating layer 842, there is formed a second conductive layer 843 consisting of chromium. Further, a reflection layer 844 consisting of aluminum is formed on the inter-layer insulating layer 821 and, on the reflection layer 844, there is formed an insulating layer 845 obtained through anodic oxidation of the reflection layer after evaporation. A transparent electrode (pixel electrode) 846 formed on the insulating layer 845 is connected to the second conductive layer 843.

As described above, in the eighth embodiment, electricity is supplied to each transparent electrode (pixel electrode) 846 through the TFD element, so that it is possible to reduce crosstalk between the transparent electrodes 846, and an image display with higher quality can be realized. Instead of the TFD element shown in the drawing, it is also possible to provide a two-terminal type non-linear element having a bidirectional diode characteristic such as a ZnO (zinc oxide) varistor, an MSI (metal semi-insulator) drive element or an RD (ring diode).

NINTH EMBODIMENT

Figure 16A:
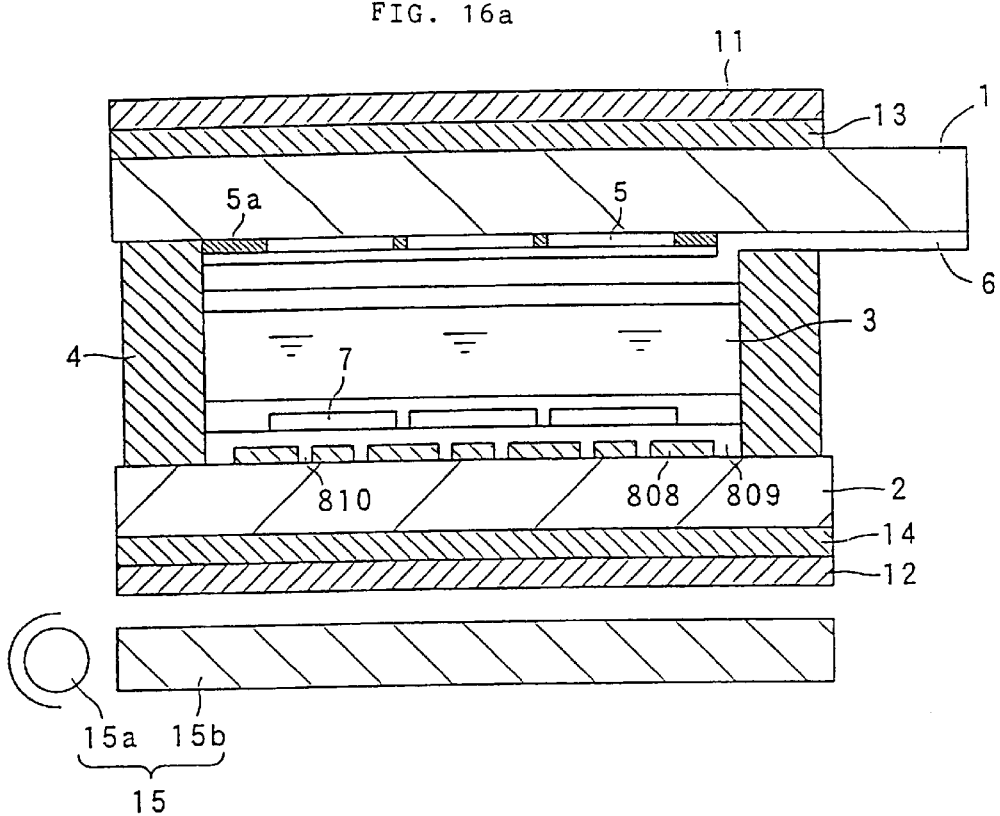
FIG. 16a is a schematic longitudinal sectional view showing the construction of a liquid crystal device according to a ninth embodiment of the present invention.
Figure 16B:
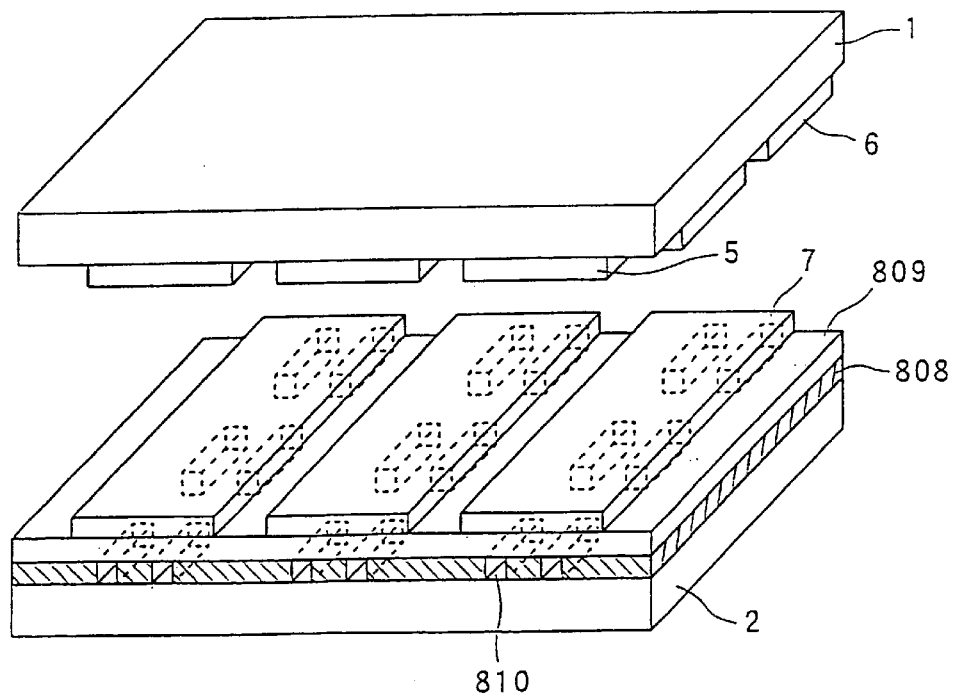

A ninth embodiment of the liquid crystal device of the present invention will be described with reference to FIGS. 16a and 16b. FIG. 16a is a schematic longitudinal sectional view of the ninth embodiment of the liquid crystal device of the present invention, and FIG. 16b is a partial perspective view thereof. The ninth embodiment has substantially the same construction as the sixth embodiment described above except for the construction of the reflection layer. In FIGS. 16a and 16b, the components which are the same as those of the sixth embodiment shown in FIGS. 13a and 13b are indicated by the same reference numerals, and a description of such components will be omitted.

In FIGS. 16a and 16b, a reflection layer 808 is formed consisting of aluminum having a thickness of 50 to 300 nm and formed in a stripe-like manner by evaporation. In particular, as in the case of the first embodiment, the reflection layer 808 is equipped with openings 810. The openings 810 can be formed simultaneously with the reflection layer 808 by photolithography. The aluminum etching is effected by wet etching using a mixture of phosphoric acid, nitric acid and acetic acid, dry etching using a chlorine type gas, and so on. Further, on the reflection layer 808, an insulating layer 809 is formed through anodic oxidation of the reflection layers after evaporation. The anodic oxidation is conducted under the same conditions as shown with respect to the sixth embodiment, and the layer thickness is the same as that in the sixth embodiment. On the insulating layer 809, a transparent electrode 807 is arranged. Apart from the above, this embodiment has the same construction as that of the sixth embodiment.

As described above, in the ninth embodiment, an insulating layer 809 which is very thin and of high insulation performance can be obtained on the reflection layers 808 provided with the openings 810. In particular, by forming the reflection layer 808 of aluminum, it is possible to maintain the reflectance even after the oxidation.

TENTH EMBODIMENT

Figure 17A:
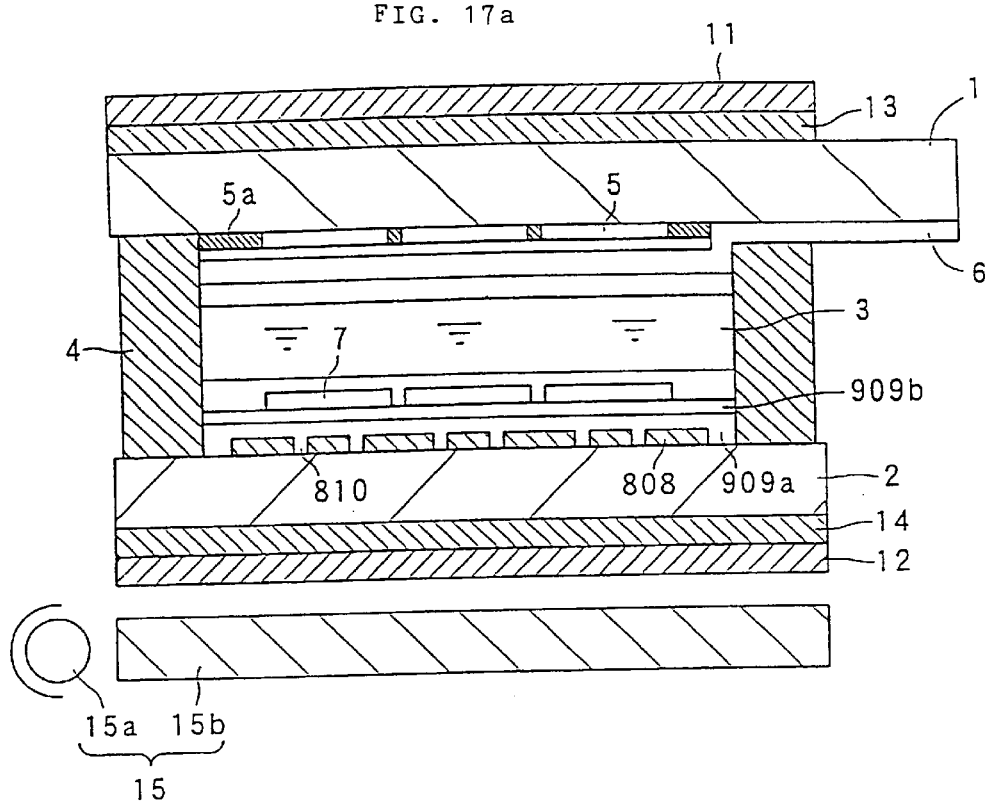
FIG. 17a is a schematic longitudinal sectional view showing the construction of a liquid crystal device according to a tenth embodiment of the present invention.
Figure 17B:
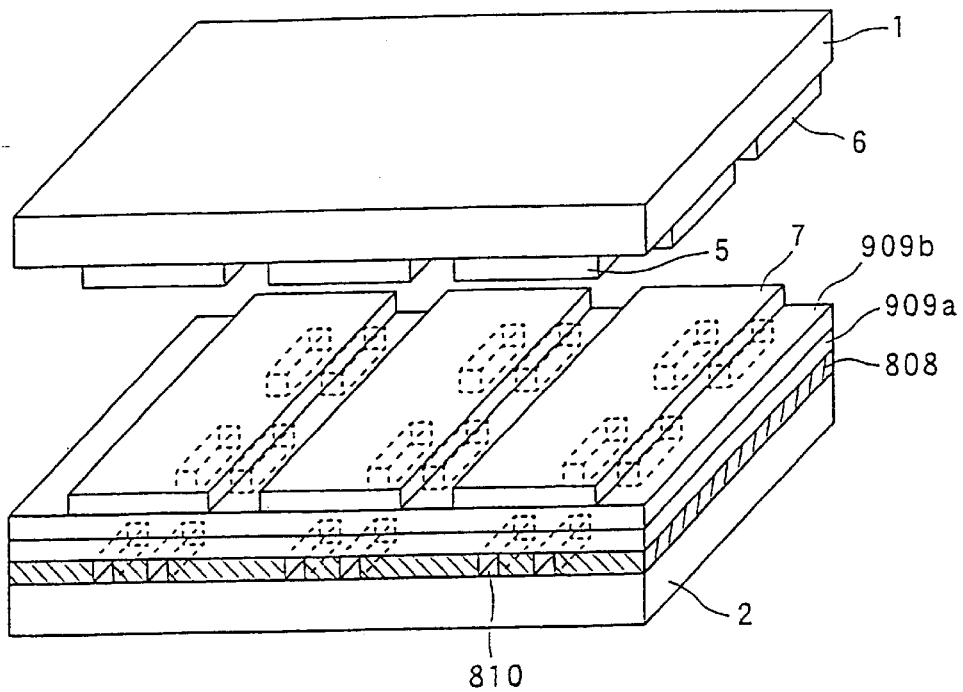

A tenth embodiment of the liquid crystal device of the present invention will be described with reference to FIGS. 17a and 17b. FIG. 17a is a schematic longitudinal sectional view of the tenth embodiment of the liquid crystal device of the present invention, and FIG. 17b is a partial perspective view thereof. The tenth embodiment has substantially the same construction as that of the ninth embodiment described above except for the construction of the insulating layer. In FIGS. 17a and 17b, the components which are the same as those of the ninth embodiment shown in FIGS. 16a and 16b are indicated by the same reference numerals, and a description thereof will be omitted.

In FIGS. 17a and 17b, an insulating layer provided on a reflection layer 808 equipped with openings 810 has a multi-layer construction including insulating layers 909a and 909b. More specifically, as an insulating layer, in addition to an oxide layer 909a obtained through anodic oxidation of a reflection layer 808 consisting of metal, there is stacked an insulating layer 909b formed through application of an organic substance by spin coating. Apart from the organic insulating layer, it is also possible to form the insulating layer 909b by evaporation of an SiO$_2$ layer or the like. The other aspects of this embodiment are the same as those of the ninth embodiment, so a detailed description thereof will be omitted.

As described above, in the tenth embodiment, it is possible to enhance the insulation performance of the insulating layer. It is possible to use an oxide of aluminum or the like for one insulating layer and an overcoat layer consisting of an SiO$_2$ layer, organic substance or the like as the other insulating layer; when forming such an $SiO_2$ layer, evaporation, sputtering, CVD method, etc. is used, and, when forming an organic layer, spin coating, etc. is used.

Here, specific examples of the openings of the reflection layers 111, 411, 808, etc. in the above embodiments described above will be described with reference to FIG. 18.

As shown in FIG. 18(*a*), it is possible to arrange four rectangular slots in the four corners or on all sides for each pixel; as shown in FIG. 18(*b*), it is possible to arrange four rectangular slots in a lateral row for each pixel; as shown in FIG. 18(*c*), it is possible to arrange a number of circular openings in dispersion for each pixel; and, as shown in FIG. 18(*d*), it is possible to arrange a single, relatively large rectangular slot for each pixel. Preferably, the total area of the openings is approximately 10% with respect to the total area of the reflection layer. The openings can be easily formed in the photo process/development process/separation process using resist. Apart from those shown in the drawing, the planar configuration of the openings 111*a* may be square, polygonal, elliptical, irregular, or in the form of slits extending over a plurality of pixels. Further, when forming the reflection layer, it is possible to simultaneously form the openings, whereby there is no need to increase the number of production processes. Further, in any configuration, the diameter of the openings is not less than 0.01 $\mu$m and not more than 20 $\mu$m. Further, it is desirable for the openings to be formed in an area proportion of not less than 5% and not more than 30% with respect to the reflection layer.

Figure 19:
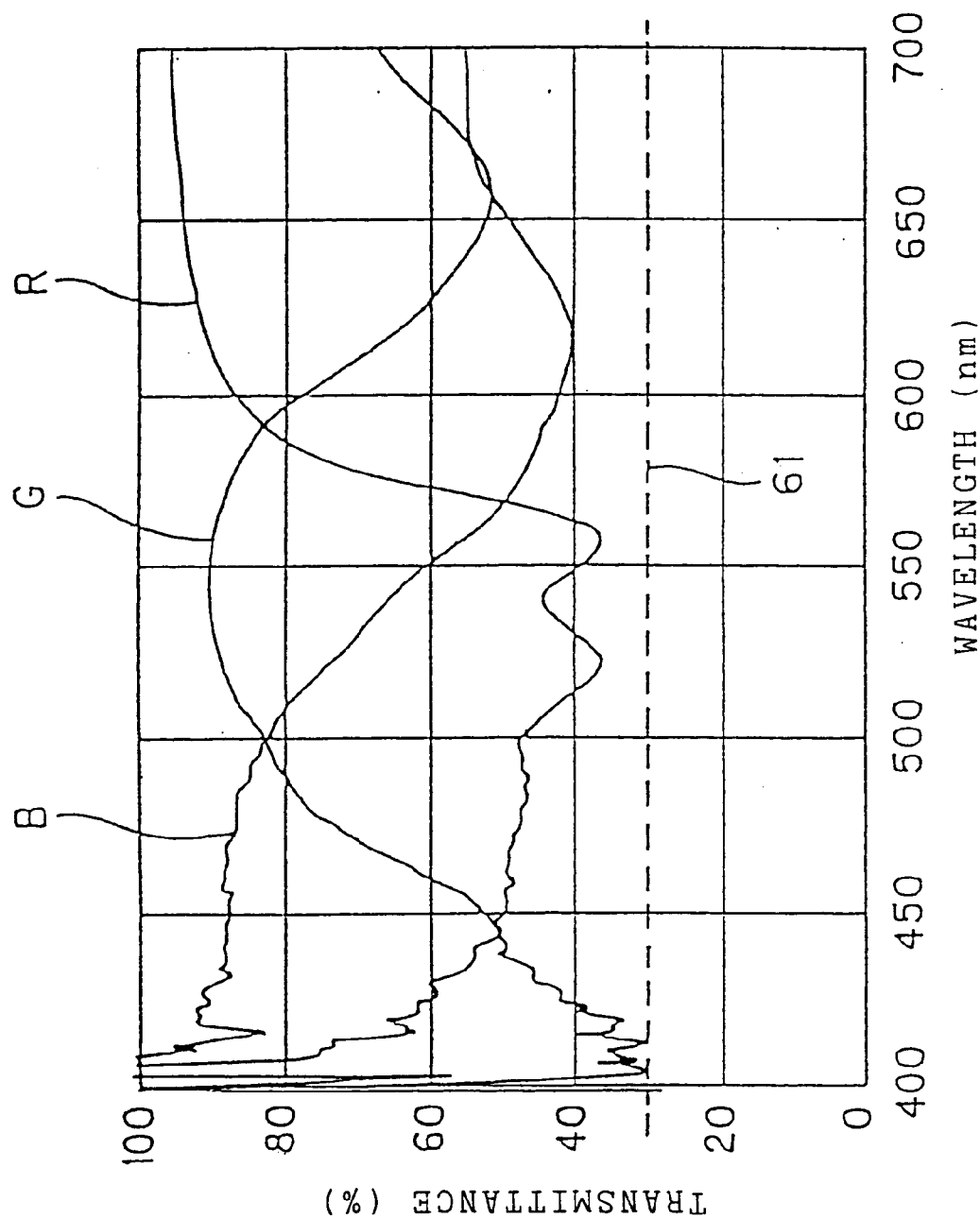
FIG. 19 is a graph showing the light transmittance of each color layer of the color filter in each embodiment.

The color layers such as the color filters 117, 414, 213, 313, etc. used in the above-described first to tenth embodiments will be described with reference to FIG. 19. FIG. 19 is a characteristic diagram showing the transmittances of the color layers of the color filter 117, etc. In each embodiment, when performing reflection type display, the incident light is once transmitted through one of the color layers of the color filter 117, etc., and then passes through the liquid crystal layer and is reflected by the transflective layer before it is transmitted through the color layer again and emitted. Thus, unlike the case of an ordinary transmission type liquid crystal device, the light passes through the color filter 117, etc. twice, so that with an ordinary color filter, the display is dark and consequently, the contrast is deteriorated. In view of this, in each embodiment, as shown in FIG. 19, the coloring of the color layer is lightened so that the minimum transmittance 61 in the visible region of each of the color layers R, G and B of the color filter 117, etc. is 25 to 50%. The lightening of the coloring of the color layers is effected by, for example, reducing the thickness of the color layers, or by reducing the concentration of the pigment or dye added to the color layers. This makes it possible to prevent the brightness of display from being reduced when effecting reflection type display.

Since the light is transmitted through the color filter 117, etc. only once when effecting transmission type display, this light coloring of the color filter 117, etc. makes the display light-colored; however, in each embodiment, much of the light from the backlight is blocked by the reflection electrode, so that it is rather convenient in securing the brightness of display.

ELEVENTH EMBODIMENT

Figure 20:
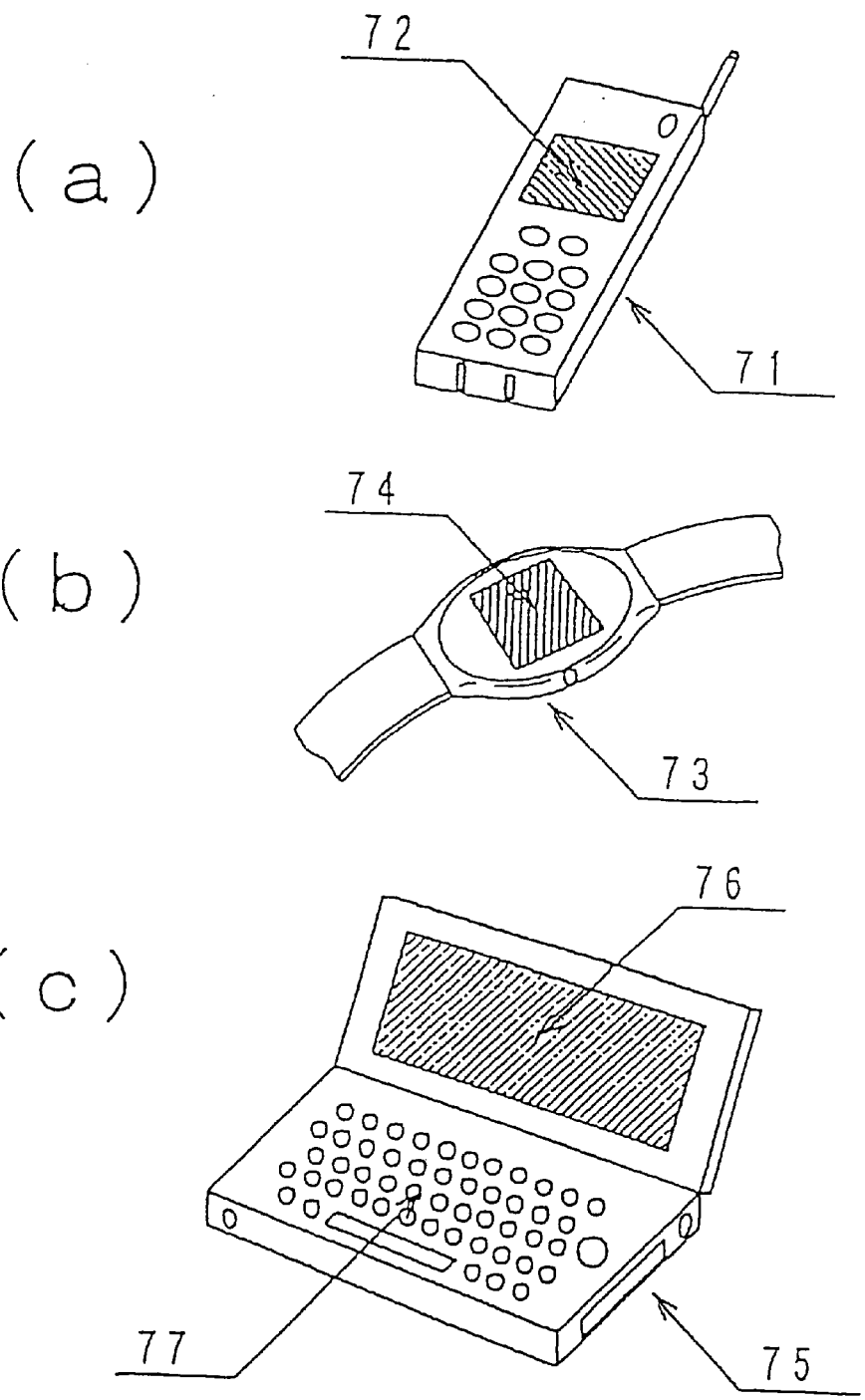
FIG. 20 is a schematic perspective view of various electronic apparatuses according to an eleventh embodiment of the present invention.

An eleventh embodiment of the present invention will be described with reference to FIG. 20. The eleventh embodiment is an embodiment of an electronic apparatus equipped with one of the first through tenth embodiments described above. That is, the eleventh embodiment relates to various electronic apparatuses in which the liquid crystal devices of the first through tenth embodiments described above are suitably used in portable apparatuses that are required to be of low power consumption in various environments. FIG. 20 shows three examples of the electronic apparatus of the present invention.

FIG. 20(*a*) shows a cellular telephone; a display section 72 is provided in the upper section of the front surface of its body 71. A cellular telephone is used in all environments, whether indoors or outdoors. In particular, it is often used in a vehicle, in which it is very dark at night. Thus, as the display device of a cellular telephone, it is desirable to use a transflective type liquid crystal device which mainly effects reflection type display involving low power consumption and which is capable of effecting transmission type display utilizing auxiliary light as needed. By using the liquid crystal device of the above-described first through tenth embodiments as the display section 72 of a cellular telephone, it is possible to obtain a cellular telephone which is brighter than in the conventional art and of high contrast ratio whether in reflection type display or transmission type display.

FIG. 20(*b*) shows a watch which has a display section 74 at the center 73 of its body. An upscale image is an important aspect to be considered in the use of a watch. When the liquid crystal device of the first to the tenth embodiment is used as the display section 74 of a watch, the watch is naturally bright and of high contrast. Further, since there is little variation in characteristic due to the wavelength of light, coloring is negligible. Thus, compared with the conventional watches, it provides a color display of a very high upscale image.

FIG. 20(*c*) shows a handheld information apparatus which has a display section 76 on the upper side of the body 75 and an input section 77 on the lower side thereof. In many cases, touch keys are provided in the front surface of the display section 76. Usually, touch keys involve much surface reflection, so that the display is hard to see. Thus, conventionally, a transmission type liquid crystal device is used in many cases as the display section even in the case of a handheld type apparatus. However, in a transmission type display device, the backlight is constantly used, so that a large power consumption is involved, and the service life of the battery is short. Even in such cases, using the liquid crystal device of the first to the tenth embodiment as the display section 76 of a handheld information apparatus makes it possible to obtain a handheld information apparatus providing a clear and bright display whether in reflection type display, transflective type display or transmission type display.

The liquid crystal device of the present invention is not limited to the above-described embodiments; modifications are possible without departing from the gist or idea of the invention that can be read from the claims and the entire specification, and a liquid crystal device thus modified is included in the technical scope of the present invention.

INDUSTRIAL APPLICABILITY

The liquid crystal device of the present invention can be used as various display devices capable of a bright, high quality image display in both dark and light places and, further, can be used as a liquid crystal device constituting the display section of various electronic apparatuses. Further, the electronic apparatus of the present invention can be used as a liquid crystal television, a view finder type or a monitor direct-view-type video tape recorder, a car navigation device, an electronic notebook, an electronic calculator, a word processor, a work station, a cellular telephone, a picture phone, a POS terminal, a touch panel, etc. formed by using such a liquid crystal device.

What is claimed is:

1. A liquid crystal device comprising
a pair of first and second transparent substrates,
a liquid crystal layer held between the first and second substrates,
a laminate which is formed on the surface on the liquid crystal layer side of the second substrate and in which at least a transflective layer and a transparent electrode layer are stacked together,
an illuminating device arranged on the side opposite to the liquid crystal layer of the second substrate,
a first polarizing plate arranged on the side opposite to the liquid crystal layer of the first substrate,
a first phase plate arranged between the first substrate and the first polarizing plate,
a second polarizing plate arranged between the second substrate and the illuminating device, and
a second phase plate arranged between the second substrate and the second polarizing plate, wherein, in the laminate, there are stacked the transflective layer, a color filter and the transparent electrode layer in that order from the side near the second substrate.

2. A liquid crystal device according to claim 1, wherein, in the laminate, protective layer is further stacked between the color filter and the transparent electrode layer.

3. A liquid crystal device according to claim 1, wherein the insulating layer is formed by oxidizing the surface portion of the transflective layer.

4. A liquid crystal device according to claim 3, wherein the insulating layer comprises two or more different kinds of insulating layers stacked together.

5. A liquid crystal device according to claim 1, wherein the transflective layer comprises a reflection layer provided with a minute opening.

6. A liquid crystal device according to claim 1, wherein a plurality of said transflective layers are formed in lines at predetermined intervals.

7. A liquid crystal device according to claim 1, wherein the device is in a dark state when it is not being driven.

8. A liquid crystal device according to claim 1, wherein the transflective layer contains not less than 95% by weight of Al and has a thickness of not less than 10 nm and not more than 40 nm.

9. A liquid crystal device according to claim 1, further comprising a scattering plate arranged on the side opposite to the liquid crystal layer of the first substrate.

10. A liquid crystal device according to claim 1, wherein the transflective layer has recesses and protrusions.

11. An electronic apparatus equipped with a liquid crystal device as claimed in claim 1.

12. A liquid crystal device comprising:
a pair of first and second transparent substrates;
a liquid crystal layer held between the first and second transparent substrates;
a laminate formed on an inner side of the second substrate, the laminate including a transflective layer and a transparent electrode layer;
an illuminating device arranged on the side opposite to the liquid crystal layer of the second substrate;
a first polarizing plate arranged on the side opposite to the liquid crystal layer of the first substrate;
a first phase plate arranged between the first substrate and the first polarizing plate;
a second polarizing plate arranged between the second substrate and the illuminating device; and
a second phase plate arranged between the second substrate and the second polarizing plate;
wherien the transflective layer and the transparent electrode layer are directly stacked together.

13. The liquid crystal device according to claim 12, wherein, on the surface of the liquid crystal layer side of the first substrate, there is formed a color filter.

14. The liquid crystal device according to claim 12, wherein a protective layer is further formed between the color filter and the transparent electrode layer.

15. The liquid crystal device according to claim 12 further comprising an active element formed on the inner side of the second substrate and connected to the transparent electrode layer.

16. The liquid crystal device according to claim 12, wherein a plurality of openings are formed in the transflective layer.

17. The liquid crystal device according to claim 12, wherein a plurality of said transflective layers are formed in lines at predetermined intervals.

18. The liquid crystal device according to claim 12 further comprising a scattering plate arranged on the outer side of the first substrate.

19. A liquid crystal device according to claim 12, wherein the device is in a dark state when it is not being driven.

20. A liquid crystal device comprising:
a pair of first and second transparent substrates;
a laminate formed on the inner side of the second substrate, in the laminate, there are stacked a transflective layer, an insulating layer and a transparent electrode layer in that order from the side near the second substrate;
an illuminating device arranged on the side opposite to the liquid crystal layer of the second substrate;
a first polarizing plate arranged on the side opposite to the liquid crystal layer of the first substrate;
a first phase plate arranged between the first substrate and the first polarizing plate;
a second polarizing plate arranged between the second substrate and the illuminating device; and
a second phase plate arranged between the second substrate and the second polarizing plate;
wherein, in the laminate, a plurality of said transparent electrode layers are arranged on the insulating layer corresponding to a plurality of said transflective layers and an area of each transflective layer is less than that of each transparent electrode layer.

21. The liquid crystal device according to claim 20 further comprising an active element formed on the second substrate and connected to the transparent electrode layer.

22. The liquid crystal device according to claim 20, wherein the plurality of said transflective layers are formed in lines at predetermined intervals.

23. The liquid crystal device according to claim 20 further comprising a scattering plate arranged on the outer side of the first substrate.

24. A liquid crystal device according to claim 20, wherein the transflective layer includes recesses and protrusions.

25. A liquid crystal device according to claim 20, wherein on the surface on the liquid crystal layer side of the first substrate, there is formed a color filter.

26. A liquid device comprising;
a pair of first and second transparent substrates;
a liquid crystal layer held between the first and second substrates;
a laminate formed on the inner side of the second substrate, in the laminate, there are stacked a transflective layer, an insulating layer and a transparent electrode layer in that order from the side near the second substrate;
an illuminating device arranged on the side opposite to the liquid crystal layer of the second substrate;
a first polarizing plate arranged on the side opposite to the liquid crystal layer of the first substrate;
a first phase plate arranged between the first substrate and the first polarizing plate;
a second polarizing plate arranged between the second substrate and the illuminating device; and
a second phase plate arranged between the second substrate and the second polarizing plate;
wherein, in the laminate, a plurality of said transparent electrode layers are arranged above the transflective layer, and the insulating layer is between the transflective layer and the plurality of said transparent electrode layers.

27. The liquid crystal device according to claim 26, wherein the laminate further comprises a color filter disposed between the transflective layer and the transparent electrode layer.

28. The liquid crystal device according to claim 26, wherein the laminate further comprises a protective layer disposed between the color filter and the plurality of said transparent electrode layers.

29. A liquid crystal device according to claim 26, wherein, on the surface on the liquid crystal layer side of the first substrate, there is formed a color filter.

30. The liquid crystal device according to claim 26, wherein the transflective layer comprises a reflection layer provided with a minute opening.

31. The liquid crystal device according to claim 26, wherein a plurality of said transflective layers are formed in lines at predetermined intervals.

32. The liquid crystal device according to claim 26, further comprising a scattering plate arranged on the outer side of the first substrate.

33. A liquid crystal device according to claim 26, wherein the transflective layer includes recesses and protrusions.

* * * * *

UNITED STATES PATENT AND TRADEMARK OFFICE
CERTIFICATE OF CORRECTION

PATENT NO. : 6,680,765 B1
APPLICATION NO. : 09/424627
DATED : January 20, 2004
INVENTOR(S) : Tsuyoshi Maeda et al.

It is certified that error appears in the above-identified patent and that said Letters Patent is hereby corrected as shown below:

On the title page item (75), "maeda" residence should be -- Ryuo-cho (JP) --

Title Page, item (56), References Cited, US Patent Documents, add -- U.S. Patent 5,724,112  3/1998 Yoshida et al --

Col. 5, line 11, "insulaing" should be -- insulating --.

Col. 8, line 14, After "construction" insert -- of --.

Col. 10, line 54, "transparent electrode 111" should be -- transparent electrode 116 --

Col. 10, line 60, "transparent electrode 111" should be -- transparent electrode 116 --

Col. 18, lines 5-6, "transmiitted" should be -- transmitted --.

Col. 27, line 29, After "laminate," insert -- a --

Col. 27, line 7, "wherein" should be -- wherein --

Signed and Sealed this

Twelfth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,680,765 B1 Page 1 of 1
APPLICATION NO. : 09/424627
DATED : January 20, 2004
INVENTOR(S) : Tsuyoshi Maeda et al.

It is certified that error appears in the above-identified patent and that said Letters Patent is hereby corrected as shown below:

On the title page item (75), "Maeda" residence should be -- Ryuo-cho (JP) --

Title Page, item (56), References Cited, US Patent Documents, add -- U.S. Patent 5,724,112 3/1998 Yoshida et al --

Col. 5, line 11, "insulaing" should be -- insulating --.

Col. 8, line 14, After "construction" insert -- of --.

Col. 10, line 54, "transparent electrode 111" should be -- transparent electrode 116 --

Col. 10, line 60, "transparent electrode 111" should be -- transparent electrode 116 --

Col. 18, lines 5-6, "transmiitted" should be -- transmitted --.

Col. 27, line 29, After "laminate," insert -- a --

Col. 28, line 7, "wherien" should be -- wherein --

This certificate supersedes Certificate of Correction issued September 12, 2006.

Signed and Sealed this

Twentieth Day of February, 2007

JON W. DUDAS
*Director of the United States Patent and Trademark Office*